United States Patent
Wu et al.

(10) Patent No.: US 12,136,973 B2
(45) Date of Patent: Nov. 5, 2024

(54) LAYER-SPECIFIC FEEDBACK PERIODICITY

(71) Applicant: QUALCOMM Incorporated, San Diego, CA (US)

(72) Inventors: Liangming Wu, Beijing (CN); Yu Zhang, San Diego, CA (US); Chenxi Hao, Beijing (CN); Kangqi Liu, San Diego, CA (US); Min Huang, Beijing (CN); Rui Hu, Beijing (CN); Hao Xu, Beijing (CN); Wei Xi, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/246,025

(22) PCT Filed: Nov. 25, 2020

(86) PCT No.: PCT/CN2020/131405
§ 371 (c)(1),
(2) Date: Mar. 20, 2023

(87) PCT Pub. No.: WO2022/109849
PCT Pub. Date: Jun. 2, 2022

(65) Prior Publication Data
US 2023/0361821 A1  Nov. 9, 2023

(51) Int. Cl.
*H04B 7/0456* (2017.01)
*H04B 7/06* (2006.01)

(52) U.S. Cl.
CPC ......... *H04B 7/0486* (2013.01); *H04B 7/0645* (2013.01)

(58) Field of Classification Search
CPC ............................ H04B 7/0486; H04B 7/0645
See application file for complete search history.

(56) References Cited

U.S. PATENT DOCUMENTS

2011/0026420 A1* 2/2011 Zhang .................. H04L 1/0026
370/252
2016/0105817 A1  4/2016 Frenne et al.
(Continued)

FOREIGN PATENT DOCUMENTS

CN 106797242 A 5/2017
CN 108024344 A 5/2018
(Continued)

OTHER PUBLICATIONS

International Search Report and Written Opinion—PCT/CN2020/131405—ISA/EPO—Aug. 10, 2021.
(Continued)

*Primary Examiner* — Sung S Ahn
(74) *Attorney, Agent, or Firm* — Paul M. McAdams; Holland & Hart LLP

(57) ABSTRACT

Methods, systems, and devices for wireless communications are described. A user equipment (UE) may receive, from a base station, a channel state information (CSI) configuration indicating a first feedback reporting periodicity for a dominant, or strong, spatial layer and a second feedback reporting periodicity for a non-dominant, or weak, spatial layer. The UE may transmit a first CSI report for at least the dominant spatial layer according to the first feedback reporting periodicity. The UE may transmit a second CSI report for the non-dominant spatial layer according to the second feedback reporting periodicity. In some cases, for aperiodic reporting, the UE may be triggered by downlink control information to report CSI for the dominant spatial layer. In some cases, the CSI configuration may indicate different codebooks for the dominant and non-dominant spatial layers.

30 Claims, 18 Drawing Sheets

(56) References Cited

U.S. PATENT DOCUMENTS

| | | | |
|---|---|---|---|
| 2016/0337056 A1* | 11/2016 | Frenne | H04W 24/10 |
| 2018/0212660 A1 | 7/2018 | Gao et al. | |
| 2021/0360460 A1* | 11/2021 | Taherzadeh Boroujeni | H04B 7/0658 |

FOREIGN PATENT DOCUMENTS

| | | |
|---|---|---|
| CN | 111246516 A | 6/2020 |
| WO | WO-2013067009 A2 | 5/2013 |

OTHER PUBLICATIONS

SONY: "Considerations on CSI Framework", 3GPP TSG-RAN WG1 #90bis, R1-1718667, Prague, Czech Republic, Oct. 9-13, 2017, Oct. 2, 2017 (Oct. 2, 2017) Section 2, 4 Pages.

Ericsson: "Type I and Type II CSI Reporting", 3GPP TSG-RAN WG1 #89ah-NR, R1-1711029, 3rd Generation Partnership Project (3GPP), Mobile Competence Centre, 650, Route Des Lucioles, F-06921, Sophia-Antipolis Cedex, France, vol. RAN WG1, No. Qingdao, China, Jun. 27, 2017-Jun. 30, 2017, Jun. 17, 2017, 10 Pages, XP051305326, The Whole Document.

Ericsson: "Summary of Views on CSI Reporting", 3GPP TSG-RAN WG1 #91, R1-1721451, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 27, 2017-Dec. 1, 2017, Nov. 29, 2017, pp. 1-12, XP051363982, The Whole Document.

Qualcomm Incorporated: "Discussion on Advanced CSI Reporting for eFD-MIMO", 3GPP TSG-RAN WG1 #87, R1-1611596, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 14, 2016-Nov. 18, 2016, Nov. 13, 2016, 6 Pages, XP051175570, The Whole Document.

Supplementary European Search Report—EP20962740—Search Authority—Munich—Jul. 30, 2024 (208985EP).

* cited by examiner

LAYER-SPECIFIC FEEDBACK PERIODICITY

CROSS REFERENCE

The present application is a 371 national stage filing of International PCT Application No. PCT/CN2020/131405 by WU et al. entitled "LAYER-SPECIFIC FEEDBACK PERIODICITY," filed Nov. 25, 2020, which is assigned to the assignee hereof, and which is expressly incorporated by reference in its entirety herein.

FIELD OF TECHNOLOGY

The following relates to wireless communications, including layer-specific feedback periodicity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may provide information such as channel state information (CSI) to a base station to convey channel quality or other metrics for channels used for communications between the base station and the UE. The information may correspond to different spatial layers supported during beamformed communications with the base station. The techniques used for reporting such information for different layers may increase overhead and signaling, which may result in inefficient use of network resources.

SUMMARY

The described techniques relate to improved methods, systems, devices, and apparatuses that support layer-specific feedback periodicity. A base station and a user equipment (UE) may communicate using beamformed communications. A transmitting device may apply precoding to data and directionally transmit the data via one or more spatial layers, or data streams, according to the precoding. Some of the spatial layers may be strong spatial layers, which may send beamformed information in the direction of the UE. Some other spatial layers may be weak spatial layers, which may not be directed as accurately toward the UE. The UE may receive a beamformed transmission from the base station and provide feedback in response. For example, the base station may transmit a channel state information (CSI) reference signal (CSI-RS). The UE may measure the CSI-RS and transmit a report to base station for the measurement.

A wireless communications system described herein supports techniques for efficient CSI reporting. For example, the UE may be configured with different periodicities or triggers to report CSI for dominant (e.g., strong) spatial layers and non-dominant (e.g., non-strong or weak) spatial layers. The UE may have one or more dominant spatial layers and one or more non-dominant spatial layers. In some cases, the UE may transmit an indication to the base station of which spatial layers correspond to the dominant spatial layers. In some cases, dominant and non-dominant spatial layers may be configured with different codebooks or codebook types. For periodic reporting, a dominant spatial layer may have a different CSI reporting periodicity than a non-dominant spatial layer. For example, dominant spatial layers may have a longer feedback reporting periodicity than non-dominant spatial layers. The base station may transmit a CSI reporting configuration including the reporting periodicities for the dominant and non-dominant spatial layers. The UE may transmit CSI reports for the dominant spatial layers and the non-dominant spatial layers according to the different periodicities. For aperiodic reporting, the base station may transmit downlink control information to trigger CSI reporting for dominant spatial layers. The UE may report CSI for non-dominant layers if dominant layer reporting is not enabled. If full layer reporting is enabled, the UE may transmit a CSI report for both the dominant and non-dominant spatial layers.

A method for wireless communications at a UE is described. The method may include receiving, from a base station, a channel state information configuration indicating a first feedback reporting periodicity for a dominant spatial layer and a second feedback reporting periodicity for a non-dominant spatial layer, where the first feedback reporting periodicity is different than the second feedback reporting periodicity, transmitting a first channel state information report for at least the dominant spatial layer according to the first feedback reporting periodicity, and transmitting a second channel state information report for the non-dominant spatial layer according to the second feedback reporting periodicity.

An apparatus for wireless communications at a UE is described. The apparatus may include a processor, memory in electronic communication with the processor, and instructions stored in the memory. The instructions may be executable by the processor to cause the apparatus to receive, from a base station, a channel state information configuration indicating a first feedback reporting periodicity for a dominant spatial layer and a second feedback reporting periodicity for a non-dominant spatial layer, where the first feedback reporting periodicity is different than the second feedback reporting periodicity, transmit a first channel state information report for at least the dominant spatial layer according to the first feedback reporting periodicity, and transmit a second channel state information report for the non-dominant spatial layer according to the second feedback reporting periodicity.

Another apparatus for wireless communications at a UE is described. The apparatus may include means for receiving, from a base station, a channel state information configuration indicating a first feedback reporting periodicity for a dominant spatial layer and a second feedback reporting periodicity for a non-dominant spatial layer, where the first feedback reporting periodicity is different than the second feedback reporting periodicity, means for transmitting a first channel state information report for at least the dominant spatial layer according to the first feedback reporting periodicity, and means for transmitting a second channel state information report for the non-dominant spatial layer according to the second feedback reporting periodicity.

A non-transitory computer-readable medium storing code for wireless communications at a UE is described. The code may include instructions executable by a processor to receive, from a base station, a channel state information configuration indicating a first feedback reporting periodicity for a dominant spatial layer and a second feedback reporting periodicity for a non-dominant spatial layer, where the first feedback reporting periodicity is different than the second feedback reporting periodicity, transmit a first channel state information report for at least the dominant spatial layer according to the first feedback reporting periodicity, and transmit a second channel state information report for the non-dominant spatial layer according to the second feedback reporting periodicity.

Some examples of the method, apparatuses, and non-transitory computer-readable medium described herein may further include operations, features, means, or instructions for receiving downlink control information based on transmitting the first channel state information report, the downlink control information including acknowledgment feedback for the first channel state information report.

In some examples of the method, apparatuses, and non-transitory computer-readable medium described herein, receiving the channel state information configuration may include operations, features, means, or instructions for receiving the channel state information configuration indicating a first codebook for the dominant spatial layer and a second codebook for the non-dominant spatial layer.

In some examples of the method, apparatuses, and non-transitory computer-readable medium described herein, the first codebook may be different than the second codebook.

Some examples of the method, apparatuses, and non-transitory computer-readable medium described herein may further include operations, features, means, or instructions for transmitting, to the base station, a precoding matrix indicator report including a layer indicator corresponding to the dominant spatial layer.

Some examples of the method, apparatuses, and non-transitory computer-readable medium described herein may further include operations, features, means, or instructions for transmitting, to the base station, a precoding matrix indicator report indicating that one or more spatial layers may be dominant spatial layers, where the one or more spatial layers may be indicated based on a rank indicator of the precoding matrix indicator report.

In some examples of the method, apparatuses, and non-transitory computer-readable medium described herein, a quantity of the one or more spatial layers may be based on a value of the rank indicator.

In some examples of the method, apparatuses, and non-transitory computer-readable medium described herein, the first channel state information report includes either channel state information for just the dominant spatial layer or a full layer report for each spatial layer based on the channel state information configuration.

In some examples of the method, apparatuses, and non-transitory computer-readable medium described herein, the first channel state information report includes channel quality information for the non-dominant spatial layer and the dominant spatial layer.

Some examples of the method, apparatuses, and non-transitory computer-readable medium described herein may further include operations, features, means, or instructions for determining an updated precoder for the dominant spatial layer and transmitting uplink control information to the base station indicating the updated precoder for the dominant spatial layer, where an indicator in the uplink control information indicates that the updated precoder may be included in the uplink control information.

In some examples of the method, apparatuses, and non-transitory computer-readable medium described herein, the first feedback reporting periodicity for the non-dominant spatial layer may be smaller than the second feedback reporting periodicity for the dominant spatial layer.

A method for wireless communications at a base station is described. The method may include transmitting, to a UE, a channel state information configuration indicating a first feedback reporting periodicity for a dominant spatial layer and a second feedback reporting periodicity for a non-dominant spatial layer, where the first feedback reporting periodicity is different than the second feedback reporting periodicity, receiving a first channel state information report for at least the dominant spatial layer according to the first feedback reporting periodicity, and receiving a second channel state information report for at least the non-dominant spatial layer according to the second feedback reporting periodicity.

An apparatus for wireless communications at a base station is described. The apparatus may include a processor, memory in electronic communication with the processor, and instructions stored in the memory. The instructions may be executable by the processor to cause the apparatus to transmit, to a UE, a channel state information configuration indicating a first feedback reporting periodicity for a dominant spatial layer and a second feedback reporting periodicity for a non-dominant spatial layer, where the first feedback reporting periodicity is different than the second feedback reporting periodicity, receive a first channel state information report for at least the dominant spatial layer according to the first feedback reporting periodicity, and receive a second channel state information report for at least the non-dominant spatial layer according to the second feedback reporting periodicity.

Another apparatus for wireless communications at a base station is described. The apparatus may include means for transmitting, to a UE, a channel state information configuration indicating a first feedback reporting periodicity for a dominant spatial layer and a second feedback reporting periodicity for a non-dominant spatial layer, where the first feedback reporting periodicity is different than the second feedback reporting periodicity, means for receiving a first channel state information report for at least the dominant spatial layer according to the first feedback reporting periodicity, and means for receiving a second channel state information report for at least the non-dominant spatial layer according to the second feedback reporting periodicity.

A non-transitory computer-readable medium storing code for wireless communications at a base station is described. The code may include instructions executable by a processor to transmit, to a UE, a channel state information configuration indicating a first feedback reporting periodicity for a dominant spatial layer and a second feedback reporting periodicity for a non-dominant spatial layer, where the first feedback reporting periodicity is different than the second feedback reporting periodicity, receive a first channel state information report for at least the dominant spatial layer according to the first feedback reporting periodicity, and receive a second channel state information report for at least the non-dominant spatial layer according to the second feedback reporting periodicity.

Some examples of the method, apparatuses, and non-transitory computer-readable medium described herein may further include operations, features, means, or instructions for transmitting downlink control information based on receiving the first channel state information report, the downlink control information including acknowledgment feedback for the first channel state information report.

Some examples of the method, apparatuses, and non-transitory computer-readable medium described herein may further include operations, features, means, or instructions for transmitting the channel state information configuration indicating a first codebook for the dominant spatial layer and a second codebook for the non-dominant spatial layer.

In some examples of the method, apparatuses, and non-transitory computer-readable medium described herein, the first codebook may be different than the second codebook.

Some examples of the method, apparatuses, and non-transitory computer-readable medium described herein may further include operations, features, means, or instructions for receiving, from the UE, a precoding matrix indicator report including a layer indicator corresponding to the dominant spatial layer.

Some examples of the method, apparatuses, and non-transitory computer-readable medium described herein may further include operations, features, means, or instructions for receiving, from the UE, a precoding matrix indicator report indicating that one or more spatial layers may be dominant spatial layers, where the one or more spatial layers may be indicated based on a rank indicator of the precoding matrix indicator report.

In some examples of the method, apparatuses, and non-transitory computer-readable medium described herein, a quantity of the one or more spatial layers may be based on a value of the rank indicator.

In some examples of the method, apparatuses, and non-transitory computer-readable medium described herein, the first channel state information report includes channel quality information for the non-dominant spatial layer and the dominant spatial layer.

Some examples of the method, apparatuses, and non-transitory computer-readable medium described herein may further include operations, features, means, or instructions for receiving uplink control information from the UE, where the uplink control information indicates an updated precoder for the dominant spatial layer, where an indicator in the uplink control information indicates that the updated precoder may be included in the uplink control information.

A method for wireless communications at a UE is described. The method may include receiving, from a base station, a channel state information configuration indicating a first codebook for a dominant spatial layer and a second codebook for a non-dominant spatial layer, where the first codebook is different than the second codebook, transmitting a first channel state information report for the non-dominant spatial layer based on the second codebook, receiving a first downlink control information configuring the UE to report channel state information for the dominant spatial layer and the non-dominant spatial layer, and transmitting a second channel state information report for the non-dominant spatial layer and the dominant spatial layer based on the first codebook and the second codebook.

An apparatus for wireless communications at a UE is described. The apparatus may include a processor, memory in electronic communication with the processor, and instructions stored in the memory. The instructions may be executable by the processor to cause the apparatus to receive, from a base station, a channel state information configuration indicating a first codebook for a dominant spatial layer and a second codebook for a non-dominant spatial layer, where the first codebook is different than the second codebook, transmit a first channel state information report for the non-dominant spatial layer based on the second codebook, receive a first downlink control information configuring the UE to report channel state information for the dominant spatial layer and the non-dominant spatial layer, and transmit a second channel state information report for the non-dominant spatial layer and the dominant spatial layer based on the first codebook and the second codebook.

Another apparatus for wireless communications at a UE is described. The apparatus may include means for receiving, from a base station, a channel state information configuration indicating a first codebook for a dominant spatial layer and a second codebook for a non-dominant spatial layer, where the first codebook is different than the second codebook, means for transmitting a first channel state information report for the non-dominant spatial layer based on the second codebook, means for receiving a first downlink control information configuring the UE to report channel state information for the dominant spatial layer and the non-dominant spatial layer, and means for transmitting a second channel state information report for the non-dominant spatial layer and the dominant spatial layer based on the first codebook and the second codebook.

A non-transitory computer-readable medium storing code for wireless communications at a UE is described. The code may include instructions executable by a processor to receive, from a base station, a channel state information configuration indicating a first codebook for a dominant spatial layer and a second codebook for a non-dominant spatial layer, where the first codebook is different than the second codebook, transmit a first channel state information report for the non-dominant spatial layer based on the second codebook, receive a first downlink control information configuring the UE to report channel state information for the dominant spatial layer and the non-dominant spatial layer, and transmit a second channel state information report for the non-dominant spatial layer and the dominant spatial layer based on the first codebook and the second codebook.

Some examples of the method, apparatuses, and non-transitory computer-readable medium described herein may further include operations, features, means, or instructions for receiving, from the base station, a second downlink control information configuring the UE to disable reporting channel state information for the dominant spatial layer.

Some examples of the method, apparatuses, and non-transitory computer-readable medium described herein may further include operations, features, means, or instructions for receiving downlink control information based on transmitting the second channel state information report, the downlink control information including acknowledgment feedback for the first channel state information report and the second channel state information report.

Some examples of the method, apparatuses, and non-transitory computer-readable medium described herein may further include operations, features, means, or instructions for transmitting, to the base station, a precoding matrix indicator report including a layer indicator corresponding to the dominant spatial layer.

Some examples of the method, apparatuses, and non-transitory computer-readable medium described herein may further include operations, features, means, or instructions for transmitting, to the base station, a precoding matrix indicator report indicating that one or more layers may be dominant spatial layers, where the one or more layers may be indicated based on a rank indicator of the precoding matrix indicator report.

In some examples of the method, apparatuses, and non-transitory computer-readable medium described herein, the first channel state information report includes channel quality information for the non-dominant spatial layer and the dominant spatial layer.

Some examples of the method, apparatuses, and non-transitory computer-readable medium described herein may further include operations, features, means, or instructions for determining an updated precoder for the dominant spatial layer and transmitting uplink control information to the base station to indicate the updated precoder for the dominant spatial layer, where an indicator in the uplink control information indicates that the updated precoder may be included in the uplink control information.

A method for wireless communications at a base station is described. The method may include transmitting, to a UE, a channel state information configuration indicating a first codebook for a dominant spatial layer and a second codebook for a non-dominant spatial layer, where the first codebook is different than the second codebook, receiving a first channel state information report for the non-dominant spatial layer based on the second codebook, transmitting a first downlink control information configuring the UE to report channel state information for the dominant spatial layer and the non-dominant spatial layer, and receiving a second channel state information report for the non-dominant spatial layer and the dominant spatial layer based on the first codebook and the second codebook.

An apparatus for wireless communications at a base station is described. The apparatus may include a processor, memory in electronic communication with the processor, and instructions stored in the memory. The instructions may be executable by the processor to cause the apparatus to transmit, to a UE, a channel state information configuration indicating a first codebook for a dominant spatial layer and a second codebook for a non-dominant spatial layer, where the first codebook is different than the second codebook, receive a first channel state information report for the non-dominant spatial layer based on the second codebook, transmit a first downlink control information configuring the UE to report channel state information for the dominant spatial layer and the non-dominant spatial layer, and receive a second channel state information report for the non-dominant spatial layer and the dominant spatial layer based on the first codebook and the second codebook.

Another apparatus for wireless communications at a base station is described. The apparatus may include means for transmitting, to a UE, a channel state information configuration indicating a first codebook for a dominant spatial layer and a second codebook for a non-dominant spatial layer, where the first codebook is different than the second codebook, means for receiving a first channel state information report for the non-dominant spatial layer based on the second codebook, means for transmitting a first downlink control information configuring the UE to report channel state information for the dominant spatial layer and the non-dominant spatial layer, and means for receiving a second channel state information report for the non-dominant spatial layer and the dominant spatial layer based on the first codebook and the second codebook.

A non-transitory computer-readable medium storing code for wireless communications at a base station is described. The code may include instructions executable by a processor to transmit, to a UE, a channel state information configuration indicating a first codebook for a dominant spatial layer and a second codebook for a non-dominant spatial layer, where the first codebook is different than the second codebook, receive a first channel state information report for the non-dominant spatial layer based on the second codebook, transmit a first downlink control information configuring the UE to report channel state information for the dominant spatial layer and the non-dominant spatial layer, and receive a second channel state information report for the non-dominant spatial layer and the dominant spatial layer based on the first codebook and the second codebook.

Some examples of the method, apparatuses, and non-transitory computer-readable medium described herein may further include operations, features, means, or instructions for transmitting, to the UE, a second downlink control information configuring the UE to disable reporting channel state information for the dominant spatial layer.

Some examples of the method, apparatuses, and non-transitory computer-readable medium described herein may further include operations, features, means, or instructions for transmitting downlink control information based on receiving the second channel state information report, the downlink control information including acknowledgment feedback for the first channel state information report and the second channel state information report.

DETAILED DESCRIPTION

Figure 1:
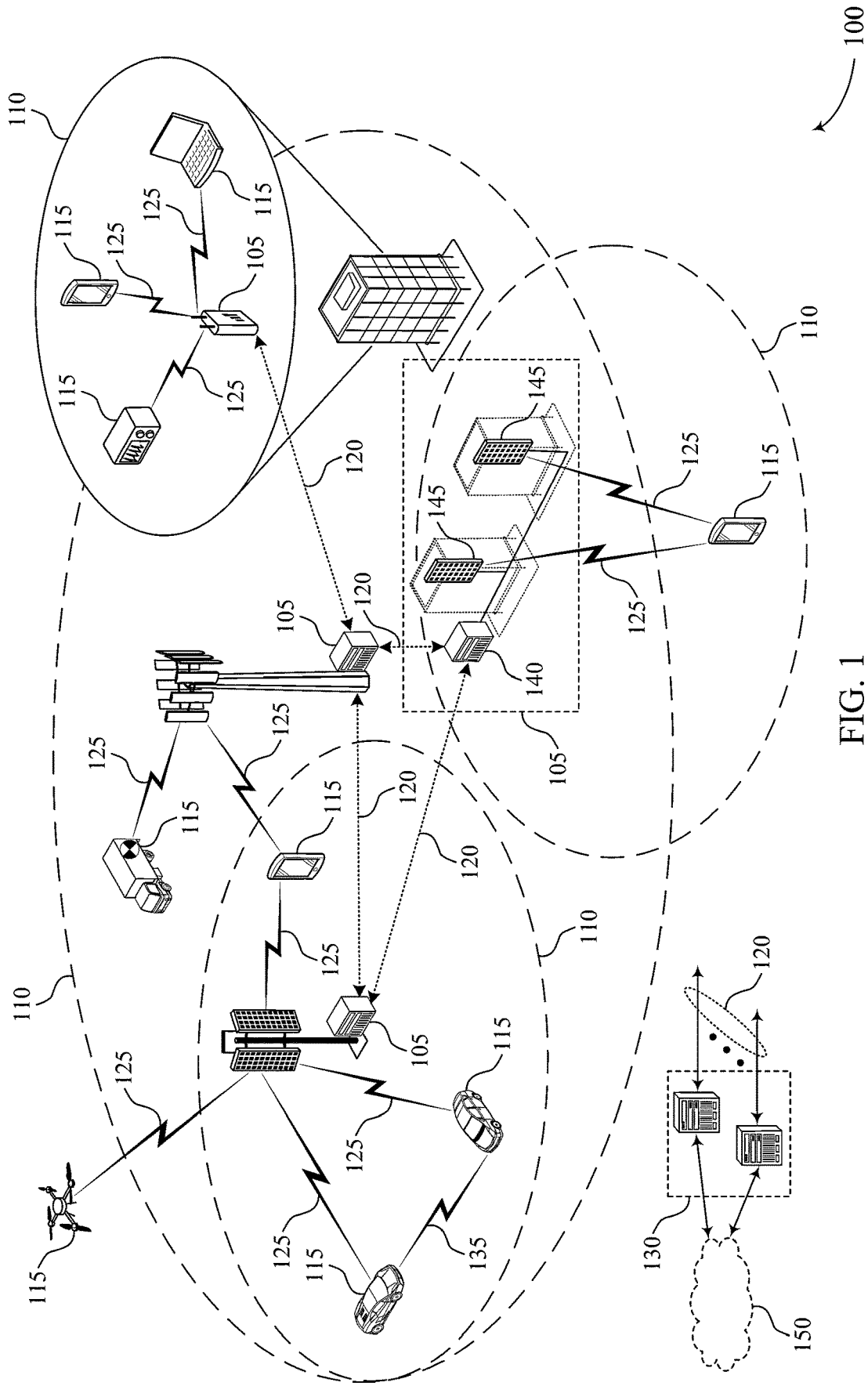
FIG. 1 illustrates an example of a wireless communications system that supports layer-specific feedback periodicity in accordance with aspects of the present disclosure.

A base station and a user equipment (UE) may communicate using beamformed communications. A transmitting device may apply precoding to data and directionally transmit the data via one or more spatial layers, or data streams, according to the precoding. In some cases, each spatial layer may have a different direction, where some spatial layers may point more directly toward a receiving device than others. Some of the spatial layers may be strong spatial layers, which may send beamformed information close to the direction of the UE. Some other spatial layers may be weak spatial layers, which may not be directed as accurately toward the UE. The UE may receive a beamformed transmission from the base station and provide feedback in response. For example, the base station may transmit a channel state information (CSI) reference signal (CSI-RS). The UE may measure the CSI-RS and transmit a report to base station for the measurement. In some systems, the feedback, such as a CSI report, may include each CSI component. For example, the feedback may include a precoding matrix indicator (PMI), a rank indicator (RI), and a channel quality indicator (CQI), all of which may be transmitted on a same uplink shared channel or uplink control channel. The feedback may indicate the beam quality and whether any of the beams should be updated to provide a stronger signal.

In some cases, the UE may frequently perform beam updates. For example, high doppler scenarios may result in more frequent beam updates to capture the channel variation. The more frequent CSI triggering may use significant overhead to send the CSI reports. For example, the frequent CSI reports may use more resources for CSI-RS pilot signals, downlink control channel resources to send downlink control information which trigger the CSI reports, uplink resources (e.g., uplink shared channel resources or uplink control channel resources) to carry the CSI reports, or any combination thereof.

A wireless communications system described herein supports techniques for efficient CSI reporting. For example, the UE may be configured with different periodicities or triggers to report CSI for dominant (e.g., strong) spatial layers and non-dominant (e.g., weak) spatial layers. The UE may have one or more dominant spatial layers and one or more non-dominant spatial layers. In some cases, the UE may transmit an indication to the base station of which spatial layers correspond to the dominant spatial layers. In some cases, dominant and non-dominant spatial layers may be configured with different codebooks or codebook types. These techniques may reduce the reporting frequency for dominant spatial layers, which may improve resource utilization and reduce overhead for CSI reporting.

For periodic reporting, a dominant spatial layer may have a different CSI reporting periodicity than a non-dominant spatial layer. For example, dominant spatial layers may have a longer feedback reporting periodicity than non-dominant spatial layers. The base station may transmit a CSI reporting configuration including the reporting periodicities for the dominant and non-dominant spatial layers. The UE may transmit CSI reports for the dominant spatial layers and the non-dominant spatial layers according to the different periodicities. For aperiodic reporting, the base station may transmit downlink control information to trigger CSI reporting for dominant spatial layers. The UE may report CSI for non-dominant layers if dominant layer reporting is not enabled. If full layer reporting is enabled, the UE may transmit a CSI report for both the dominant and non-dominant spatial layers.

Aspects of the disclosure are initially described in the context of wireless communications systems. Aspects of the disclosure are further illustrated by and described with reference to apparatus diagrams, system diagrams, and flowcharts that relate to layer-specific feedback periodicity.

FIG. 1 illustrates an example of a wireless communications system 100 that supports layer-specific feedback periodicity in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support techniques for efficient CSI reporting. For example, a UE 115 may be configured with different periodicities or triggers to report CSI for dominant spatial layers and non-dominant (e.g., weaker) spatial layers. The UE 115 may have one or more dominant spatial and one or more non-dominant spatial layers. In some cases, the UE 115 may transmit an indication to a base station 105 of which spatial layers correspond to the dominant spatial layers. In some cases, dominant and non-dominant spatial layers may be configured with different codebooks or codebook types. These techniques may reduce the reporting frequency for dominant spatial layers, which may improve resource utilization and reduce overhead for CSI reporting.

For periodic reporting, a dominant spatial layer may have a different CSI reporting periodicity than a non-dominant spatial layer. For example, dominant spatial layers may have a longer feedback reporting periodicity than non-dominant spatial layers. The base station 105 may transmit a CSI reporting configuration to the UE 115 including the reporting periodicities for the dominant and non-dominant spatial layers. The UE 115 may transmit a CSI report for the non-dominant spatial layer according to the periodicity for the non-dominant spatial layers, and the UE 115 may transmit a CSI report for the dominant spatial layer according to the periodicity for the dominant spatial layers. In some cases, the UE 115 may overall use fewer uplink resources to convey CSI, as the UE 115 may less frequently transmit CSI for the dominant spatial layers.

For aperiodic reporting, the base station 105 may transmit downlink control information to trigger reporting for dominant spatial layers. For example, the UE 115 may report CSI for non-dominant layers if dominant layer reporting is not enabled. The base station 105 may transmit a CSI reporting configuration to the UE 115 to configure CSI reporting for the dominant and non-dominant layers. If full layer reporting is enabled, the UE 115 may transmit a CSI report for both the dominant and non-dominant spatial layers. Otherwise, the UE 115 may just transmit a CSI report for the non-dominant spatial layers.

Figure 2:
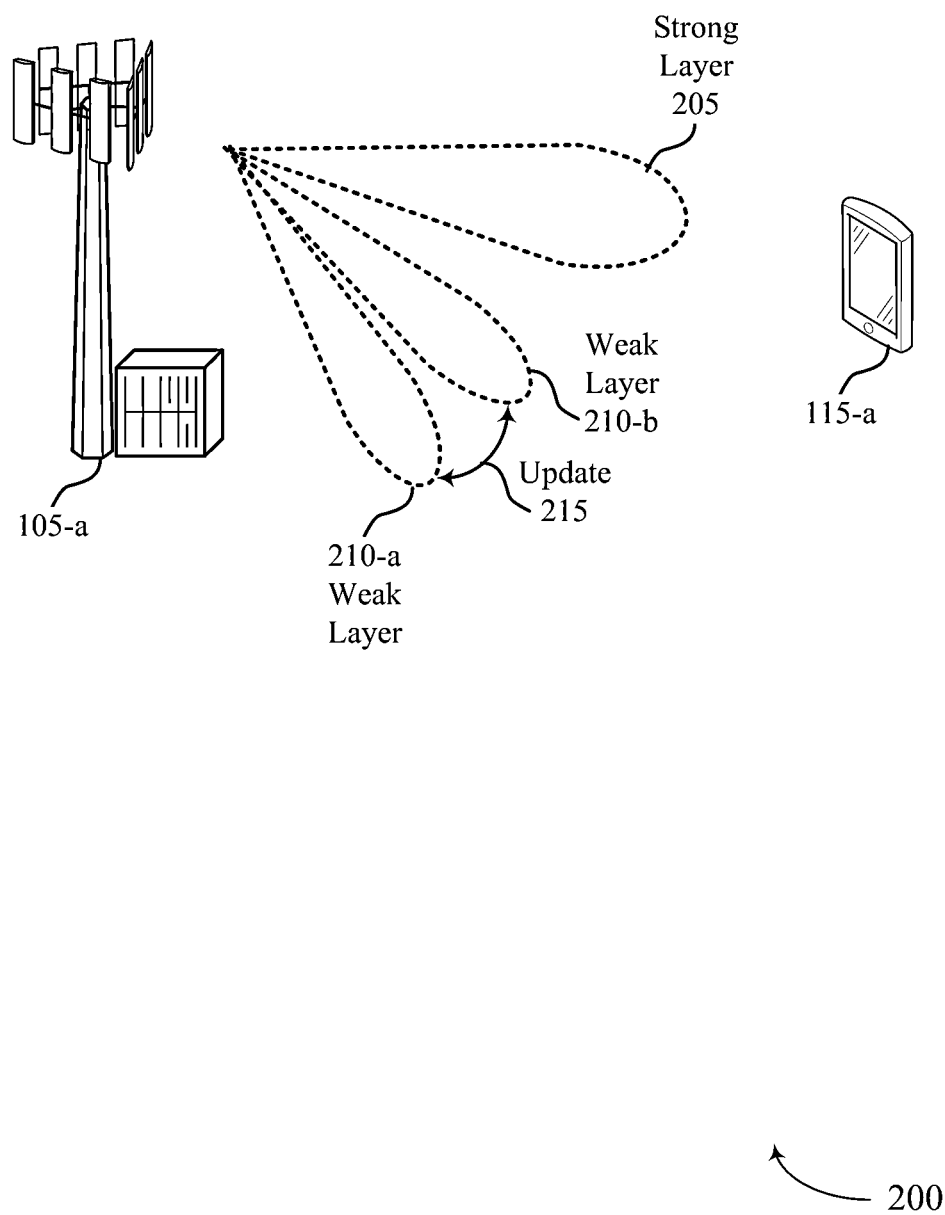
FIG. 2 illustrates an example of a wireless communications system that supports layer-specific feedback periodicity in accordance with aspects of the present disclosure.

FIG. 2 illustrates an example of a wireless communications system 200 that supports layer-specific feedback periodicity in accordance with aspects of the present disclosure. The wireless communications system 200 includes UE 115-a and base station 105-a, which may be respective examples of a UE 115 and a base station 105 described with reference to the wireless communications system 100 of FIG. 1.

Base station 105-a and UE 115-a may communicate using beamformed communications. A transmitting device may apply precoding to data directionally transmit the data via one or more layers according to the precoding. In some cases, each spatial layer may have a different direction, where some spatial layers may point more directly toward a receiving device than others.

For example, base station 105-a may transmit to UE 115-a using multiple spatial layers. Some of the spatial layers may be strong spatial layers, such as a strong layer 205, which may send beamformed information close to the direction of UE 115-a. Some other spatial layers, such as weak layer 210-a, may also carry information, but the weak spatial layers 210 may not be directed as accurately toward UE 115-a. Base station 105-a may have one or more strong spatial layers or one or more weak spatial layers, or one or more of each strong spatial layers and weak spatial layers. In some cases, a dominant spatial layer may be stronger than a weak spatial layer, but a weak spatial layer may generally provide a sufficient signal quality or strength.

UE 115-a may receive a transmission from base station 105-a and provide feedback in response. For example, base station 105-a may transmit a CSI-RS. UE 115-a may measure the CSI-RS and transmit a report to base station 105-a for the measurement. In some systems, the feedback, such as a CSI report, may include each CSI component. For example, the feedback may include a PMI, an RI, and a CQI, all of which may be transmitted on a same uplink shared channel or uplink control channel. The feedback may indicate the beam quality and whether any of the beams should be updated to provide a stronger signal.

In some cases, UE 115-a may frequently perform beam updates. For example, high doppler scenarios may result in more frequent beam updates to capture the channel variation. The more frequent CSI triggering may use significant overhead to send the CSI reports. For example, the frequent CSI reports may use more resources for CSI-RS pilot signals, downlink control channel resources to send downlink control information which trigger the CSI reports, uplink resources (e.g., uplink shared channel resources or uplink control channel resources) to carry the CSI reports, or any combination thereof.

In some current systems, a UE 115 may report CSI for both strong spatial layers and weak spatial layers each time a CSI report is triggered. However, strong spatial layers may be updated less often than weak spatial layers even with the frequent CSI report triggering. For example, UE 115-a may perform an update 215 to change from weak layer 210-a to weak layer 210-b, but UE 115-a may not perform an update for strong layer 205. Therefore, in these systems, these wireless communications systems may allocate resources to report CSI for spatial layers which may not be updated, which may be an inefficient use of wireless resources.

The wireless communications system 200 supports techniques for efficient CSI reporting. For example, UE 115-*a* may be configured with different periodicities or triggers to report CSI for dominant (e.g., strong) spatial layers and non-dominant (e.g., weak) spatial layers. UE 115-*a* may have one or more dominant spatial layers (e.g., including the strong layer 205) and one or more non-dominant spatial layers (e.g., including weak layer 210-*b*). In some cases, UE 115-*a* may transmit an indication to base station 105-*a* of which spatial layers correspond to the dominant spatial layers. In some cases, dominant and non-dominant spatial layers may be configured with different codebooks or codebook types. These techniques may reduce the reporting frequency for dominant spatial layers, which may improve resource utilization and reduce overhead for CSI reporting.

For periodic reporting, a dominant spatial layer may have a different CSI reporting periodicity than a non-dominant spatial layer. For example, dominant spatial layers may have a longer feedback reporting periodicity than non-dominant spatial layers. Base station 105-*a* may transmit a CSI reporting configuration to UE 115-*a* including the reporting periodicities for the dominant and non-dominant spatial layers. UE 115-*a* may transmit a CSI report for the non-dominant spatial layer according to the periodicity for the non-dominant spatial layers, and UE 115-*a* may transmit a CSI report for the dominant spatial layer according to the periodicity for the dominant spatial layers. In some cases, UE 115-*a* may overall use fewer uplink resources to convey CSI, as UE 115-*a* may less frequently transmit CSI for the dominant spatial layers. An example of periodic reporting with different periodicities for dominant and non-dominant spatial layers is described in more detail with reference to FIG. 3.

For aperiodic reporting, base station 105-*a* may transmit downlink control information to trigger reporting for dominant spatial layers. For example, UE 115-*a* may report CSI for non-dominant layers if dominant layer reporting is not enabled. Base station 105-*a* may transmit a CSI reporting configuration to UE 115-*a* to configure CSI reporting for the dominant and non-dominant layers. If full layer reporting is enabled, UE 115-*a* may transmit a CSI report for both the dominant and non-dominant spatial layers. Otherwise, UE 115-*a* may just transmit a CSI report for the non-dominant spatial layers. An example of these techniques for aperiodic reporting is described in more detail with reference to FIG. 4.

In some examples, base station 105-*a* may separately configure codebooks for dominant and non-dominant spatial layers. For example, base station 105-*a* may configure a hybrid codebook type for the dominant and non-dominant spatial layers. A dominant spatial layer or a non-dominant spatial layer, or both, may be configured with a semi-open loop precoder, a close loop precoder, a Type 1 precoder, a Type 2 precoder, or an enhanced Type 2 precoder. In some cases, dominant spatial layers and non-dominant spatial layers may have different ranks. For example, a first spatial layer may be configured as a dominant spatial layer with a Type 1 PMI, and a second spatial layer may be configured as a non-dominant spatial layer with a semi-open loop PMI. In another example, the dominant layer may be configured as a Type 2 PMI, and the non-dominant layer may be configured as a Type 1 or semi-open loop PMI. Other examples or combinations may be configured for the dominant layers and non-dominant layers.

In some cases, UE 115-*a* may transmit an indication of the one or more dominant spatial layers to base station 105-*a*.

For example, UE 115-*a* may use a layer indication (LI) field of a PMI report to indicate a dominant spatial layer. In some cases, UE 115-*a* may indicate the dominant spatial layer via the LI field when a full-layer PMI report is enabled. In some cases, if UE 115-*a* indicates the dominant spatial layer via the LI field, UE 115-*a* may support a single dominant layer. In some other examples, the dominant layers may be the first m layers in a feedback PMI. The value of m may be less than the rank as indicated by the PMI report. In some cases, the m value may be preconfigured at UE 115-*a* or predefined or configured via RRC signaling. For example, UE 115-*a* may transmit a PMI report indicating the m value and the rank, such as (1,2), (1,3), and (2,4). By using the first m spatial layers in the PMI report, UE 115-*a* may support multiple dominant spatial layers.

In some examples, base station 105-*a* and UE 115-*a* may synchronize on the PMI information. For example, when reporting CSI periodically, if a full-layer report is not correctly received at base station 105-*a*, a following partial-layer report may have some ambiguity. For example, UE 115-*a* may assume that base station 105-*a* did not receive the dominant layer's information in the CSI report. Therefore, to synchronize the PMI information, base station 105-*a* may transmit acknowledgment feedback for a full layer report in downlink control information. For example, base station 105-*a* may include an acknowledgment report in downlink control information for a full layer report transmitted in uplink control information.

In some example, UE 115-*a* may report an update for a dominant spatial layer. For example, UE 115-*a* can report a dominant spatial layer if a precoder for a dominant spatial layer has changed. In some cases, UE 115-*a* may include additional signaling in uplink control information to indicate that a CSI report includes an updated dominant layer or not. In some cases, UE 115-*a* may indicate an updated precoder for the dominant spatial layer.

In some examples, a partial layer report may include CQI for the full spatial layers. For example, UE 115-*a* may transmit a CSI report for a non-dominant spatial layer and include CQI for the dominant spatial layers and the non-dominant spatial layers. CQI may be updated while PMI is fixed at a full layer CSI report. In some cases, UE 115-*a* may calculate a full layer PMI or CQI using singular value decomposition to obtain a first domain singular vector as the dominant layer's precoder. In some cases, PMI for partial layers may be calculated by the null space of an earlier report dominant layer's precoder.

Figure 3:
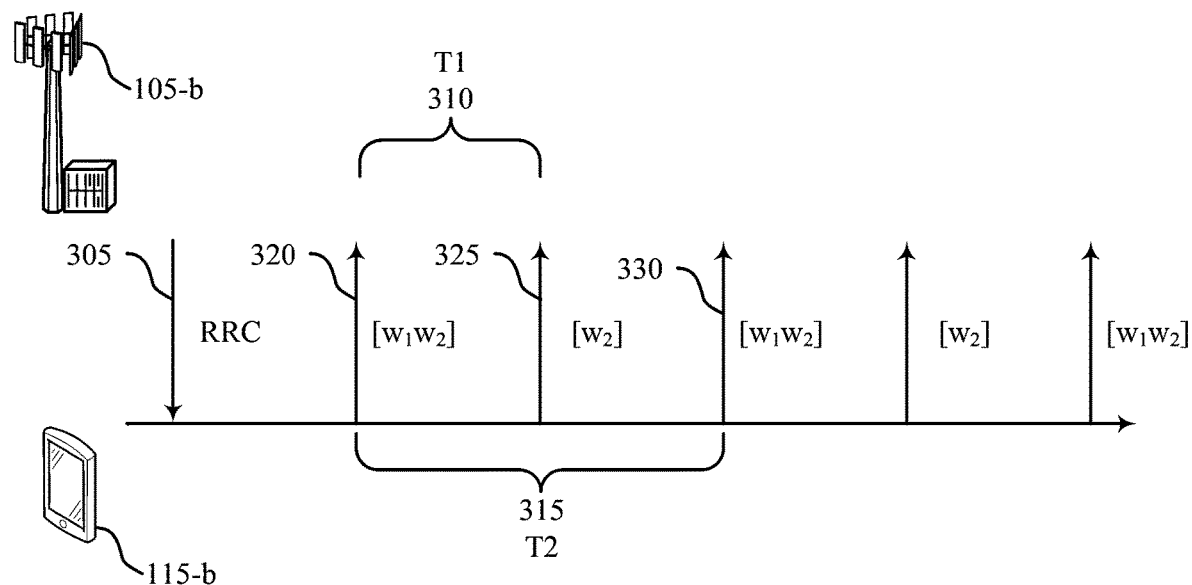
FIG. 3 illustrates an example of a periodic CSI reporting process flow that supports layer-specific feedback periodicity in accordance with aspects of the present disclosure.

FIG. 3 illustrates an example of a periodic reporting process flow 300 that supports layer-specific feedback periodicity in accordance with aspects of the present disclosure. The periodic reporting process flow may be implemented by UE 115-*b* or base station 105-*b*, or both. UE 115-*b* and base station 105-*b* may be examples of a UE 115 and a base station 105 described with reference to FIGS. 1 and 2.

UE 115-*b* may be configured with multiple spatial layers for communicating with base station 105-*b*. In some cases, UE 115-*b* may be configured with one or more dominant spatial layers and one or more non-dominant spatial layers. In some cases, UE 115-*b* may transmit an indication of the dominant spatial layers to base station 105-*b*. For example, UE 115-*b* may determine a dominant spatial layer based on a signal strength for the spatial layers or a rate at which the spatial layers are updated. In some cases, a dominant spatial layer may be referred to as a strong spatial layer, where signal strength measurements for the dominant spatial layer may be greater than signal strength measurements for non-dominant spatial layers. UE 115-*b* may indicate the dominant spatial layer to base station 105-*b* via a PMI report. For example, the dominant spatial layer may be indicated by a layer indication of the PMI report, or UE 115-*b* may indicate one or more dominant spatial layers corresponding to a first m spatial layers in a PMI report.

At 305, base station 105-*b* may transmit, to UE 115-*b*, a CSI configuration indicating a first feedback reporting periodicity 310 for a dominant spatial layer and a second feedback reporting periodicity 315 for a non-dominant spatial layer. In some cases, the first feedback reporting periodicity may be different than the second feedback reporting periodicity. In some cases, the CSI configuration may be transmitted via RRC signaling.

The first feedback reporting periodicity 310 may be longer than the second feedback reporting periodicity 315. For example, the first feedback reporting periodicity 310 may be 20 milliseconds, and the second feedback reporting periodicity 315 may be 10 milliseconds. In some other examples, the periodicities may be different, such as 5 milliseconds for the first feedback reporting periodicity 310 and 20 milliseconds for the second feedback reporting periodicity 315.

In some cases, the CSI configuration may indicate codebooks for the dominant spatial layer and the non-dominant spatial layer. In some cases, the codebooks for the dominant spatial layer and the non-dominant spatial layer may be different. For example, the dominant spatial layer may use a Type 2 codebook, and the non-dominant spatial layer may use a Type 1 codebook.

At 320, UE 115-*b* may transmit a first CSI report for at least the dominant spatial layer according to the first feedback reporting periodicity. For example, at 320, UE 115-*b* may transmit the first CSI report including CSI for the dominant spatial layer, $w_1$, and the non-dominant spatial layer, $w_2$. The first CSI report may be encoded according to the first codebook or the second codebook, or both.

In some cases, UE 115-*b* may receive downlink control information based on transmitting the first CSI report, the downlink control information including acknowledgment feedback for the first CSI report. The acknowledgment feedback in response to the full layer report may synchronize PMI between UE 115-*b* and base station 105-*b*.

At 325, UE 115-*b* may transmit a second CSI report for the non-dominant spatial layer according to the second feedback reporting periodicity. For example, the second CSI report may include CSI elements for just the non-dominant spatial layers. By reporting CSI for just the non-dominant spatial layers, UE 115-*b* may use fewer resources to send the CSI, thereby reducing overhead for CSI reporting. In some examples, the second CSI report may include CQI for the dominant spatial layers and the non-dominant spatial layers.

At 330, UE 115-*b* may transmit a third CSI report for the dominant spatial layer according to the first feedback reporting periodicity. The third CSI report may also include CSI for the non-dominant spatial layer. For example, the first feedback reporting periodicity 310 and the second feedback reporting periodicity 315 may coincide at 330, such that CSI reporting is triggered for both the dominant spatial layer and the non-dominant spatial layer.

Figure 4:
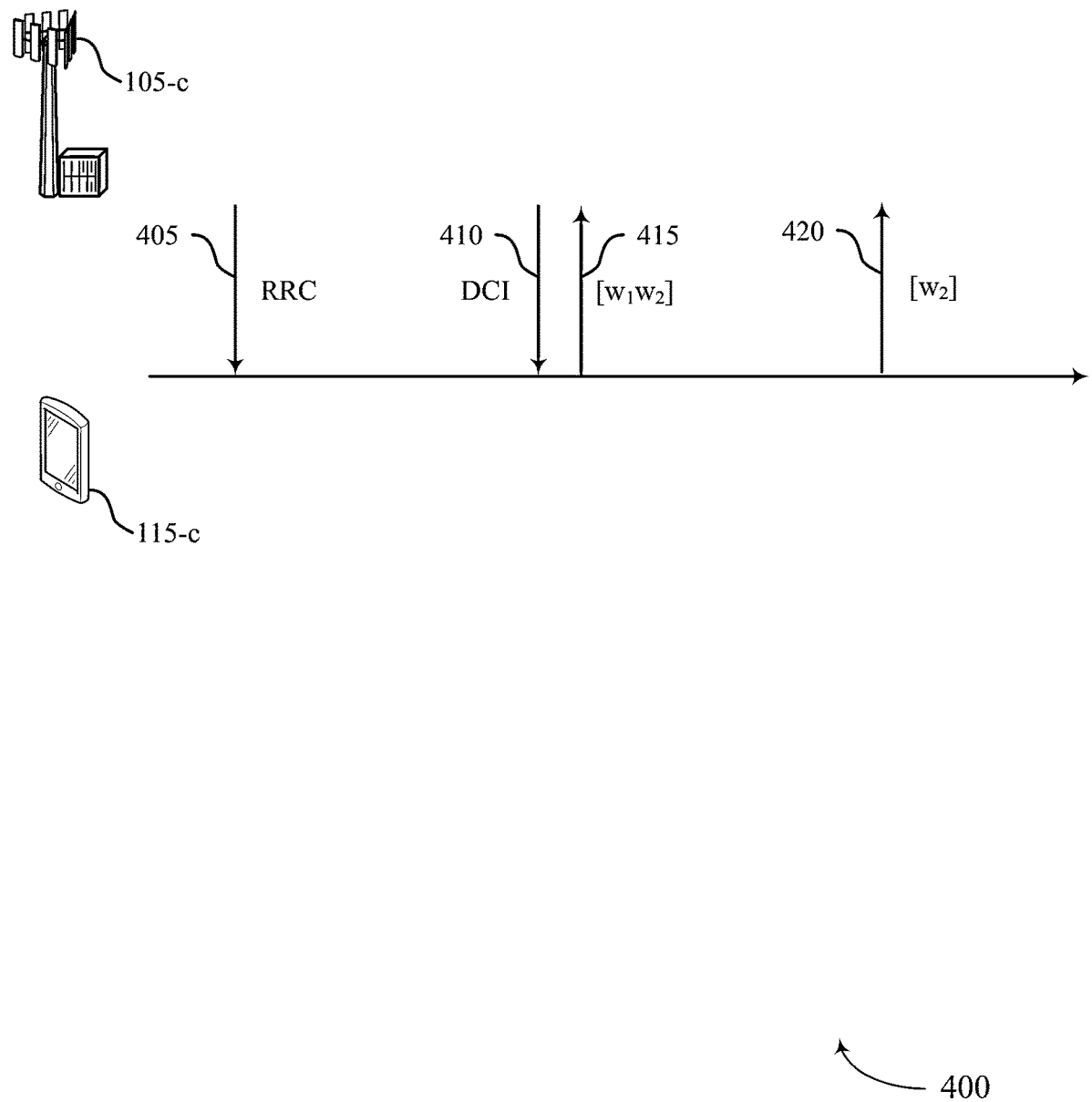
FIG. 4 illustrates an example of an aperiodic CSI reporting process flow that supports layer-specific feedback periodicity in accordance with aspects of the present disclosure.

FIG. 4 illustrates an example of an aperiodic CSI reporting process flow 400 that supports layer-specific feedback periodicity in accordance with aspects of the present disclosure. The aperiodic reporting process flow may be implemented by UE 115-*c* or base station 105-*c*, or both. UE 115-*c* and base station 105-*c* may be examples of a UE 115 and a base station 105 described with reference to FIGS. 1 and 2.

UE 115-*c* may be configured with multiple spatial layers for communicating with base station 105-*c*. In some cases, UE 115-*c* may be configured with one or more dominant spatial layers and one or more non-dominant spatial layers. In some cases, UE 115-*c* may transmit an indication of the dominant spatial layers to base station 105-*b* via a PMI report. For example, the dominant spatial layer may be indicated by a layer indication of the PMI report, or UE 115-*b* may indicate one or more dominant spatial layers corresponding to a first m spatial layers in a PMI report.

At 405, base station 105-*c* may transmit, to UE 115-*c*, a CSI configuration indicating a first feedback codebook for a dominant spatial layer and a second codebook for a non-dominant spatial layer. In some cases, the codebooks for the dominant spatial layer and the non-dominant spatial layer may be different. For example, the dominant spatial layer may use a Type 2 codebook, and the non-dominant spatial layer may use a Type 1 codebook. In some cases, the CSI configuration may be transmitted via RRC signaling. In some examples, the CSI configuration may indicate periodicities for the dominant spatial layer and the non-dominant spatial layer. For example, UE 115-*c* may support both periodic reporting schemes and aperiodic reporting schemes. In some examples, UE 115-*c* may be configured for periodic reporting, aperiodic reporting, or both.

For some aperiodic reporting schemes, UE 115-*c* may report CSI for the dominant spatial layer on demand. For example, at 410, UE 115-*c* may receive downlink control information configuring UE 115-*c* to report CSI for the dominant spatial layer and the non-dominant spatial layer. The downlink control information may trigger UE 115-*c* to send CSI for the dominant spatial layer. At 415, UE 115-*c* may transmit a CSI report for the dominant spatial layer, $w_1$, and the non-dominant spatial layer, $w_2$, based on the first codebook or the second codebook, or both. In some cases, UE 115-*c* may be triggered to transmit a one-time CSI report for the dominant spatial layer, or CSI reporting for the dominant spatial layer may be enabled and disabled. In some cases, CSI reporting for the dominant spatial layer may be triggered or enabled and disabled via a MAC control element. In some cases, UE 115-*c* may receive a second downlink control information disabling dominant spatial layer CSI reporting.

In some cases, UE 115-*c* may receive downlink control information based on transmitting the CSI report, the downlink control information including acknowledgment feedback for the CSI report for the dominant spatial layer and the non-dominant spatial layer. The acknowledgment feedback in response to the full layer report may synchronize PMI between UE 115-*b* and base station 105-*b*.

At 420, UE 115-*c* may transmit a CSI report for the non-dominant spatial layer based on the second codebook. For example, UE 115-*c* may not be triggered or configured to report CSI for the dominant spatial layer at 420. Therefore, the first CSI report may, in some cases, just include CSI for the non-dominant spatial layer, $w_2$.

Figure 5:
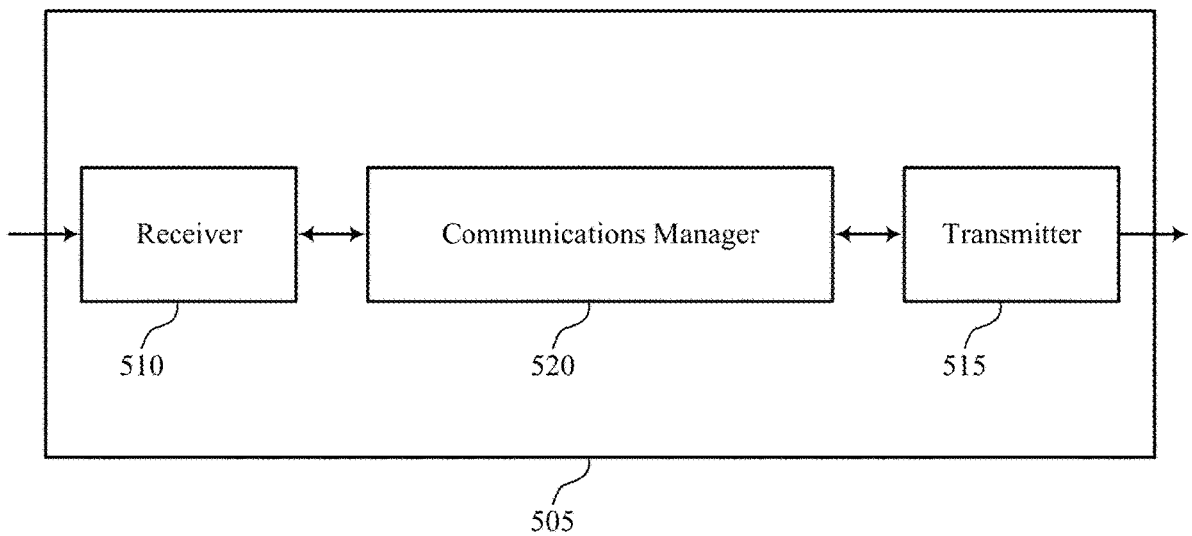
FIGS. 5 and 6 show block diagrams of devices that support layer-specific feedback periodicity in accordance with aspects of the present disclosure.

FIG. 5 shows a block diagram 500 of a device 505 that supports layer-specific feedback periodicity in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to layer-specific feedback periodicity). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to layer-specific feedback periodicity). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of layer-specific feedback periodicity as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The communications manager 520 may be configured as or otherwise support a means for transmitting a first channel state information report for at least the dominant spatial layer according to the first feedback reporting periodicity. The communications manager 520 may be configured as or otherwise support a means for transmitting a second channel state information report for the non-dominant spatial layer according to the second feedback reporting periodicity.

Additionally or alternatively, the communications manager 520 may support wireless communications at a UE in accordance with examples as disclosed herein. For example, the communications manager 520 may be configured as or otherwise support a means for receiving, from a base station, a channel state information configuration indicating a first codebook for a dominant spatial layer and a second codebook for a non-dominant spatial layer, where the first codebook is different than the second codebook. The communications manager 520 may be configured as or otherwise support a means for transmitting a first channel state information report for the non-dominant spatial layer based on the second codebook. The communications manager 520 may be configured as or otherwise support a means for receiving a first downlink control information configuring the UE to report channel state information for the dominant spatial layer and the non-dominant spatial layer. The communications manager 520 may be configured as or otherwise support a means for transmitting a second channel state information report for the non-dominant spatial layer and the dominant spatial layer based on the first codebook and the second codebook.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for efficient resource utilization and reduced overhead for CSI reporting. For example, by reducing a frequency for reporting CSI for each configured layer, a UE 115 may use fewer resources to report CSI. The UE 115 may update strong, or dominant, layers less frequently than weak, or non-dominant, layers. The techniques described herein support reporting CSI for the dominant layers less frequently while still providing the UE 115 opportunities to update weak layers. The reduction in overhead may provide more available resources for a wireless communications system, which may overall increase throughput in the wireless communications system.

Figure 6:
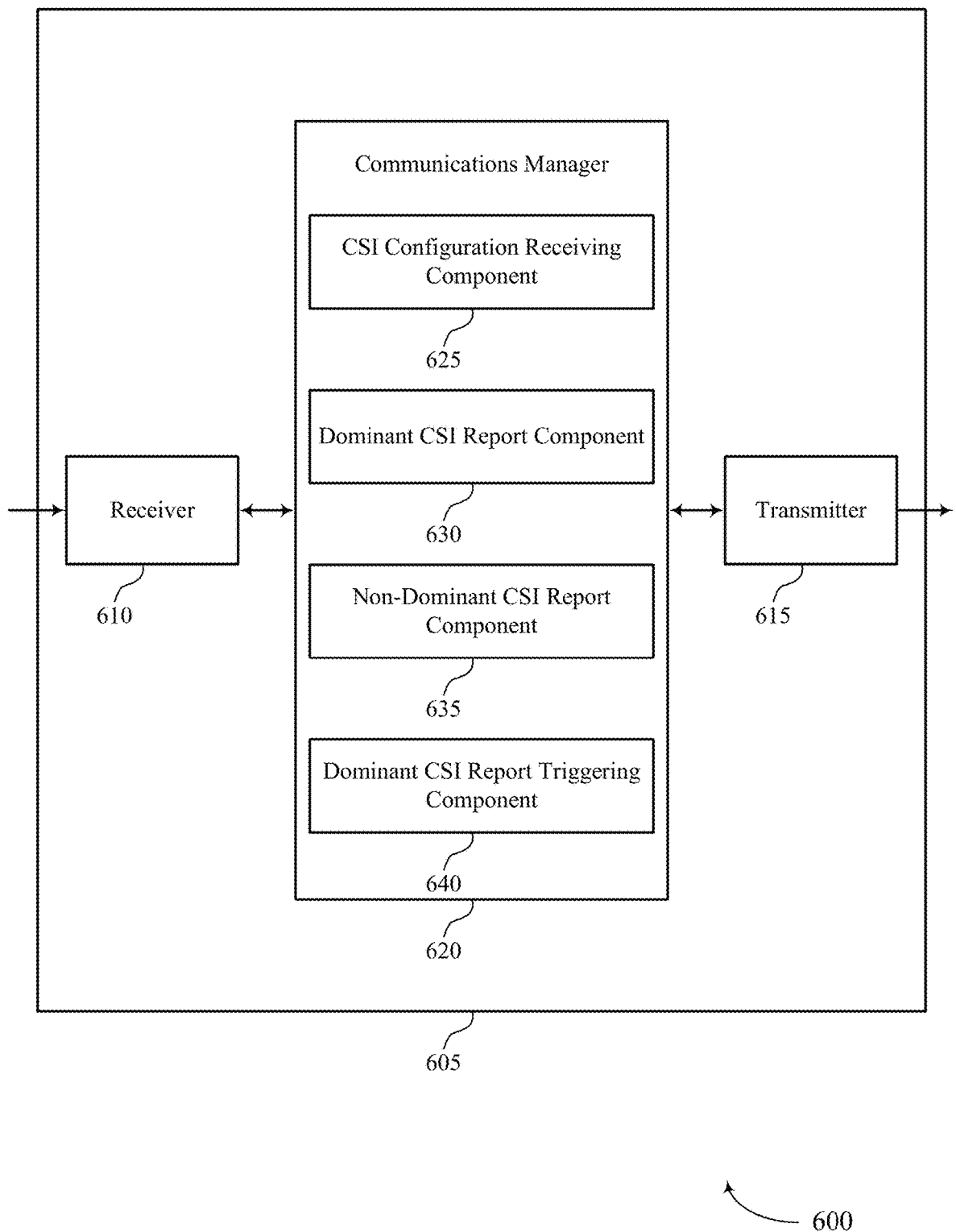

FIG. 6 shows a block diagram 600 of a device 605 that supports layer-specific feedback periodicity in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to layer-specific feedback periodicity). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to layer-specific feedback periodicity). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of layer-specific feedback periodicity as described herein. For example, the communications manager 620 may include a CSI configuration receiving component 625, a dominant CSI report component 630, a non-dominant CSI report component 635, a dominant CSI report triggering component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The CSI configuration receiving component 625 may be configured as or otherwise support a means for receiving, from a base station, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The dominant CSI report component 630 may be configured as or otherwise support a means for transmitting a first channel state information report for at least the dominant spatial layer according to the first feedback reporting periodicity. The non-dominant CSI report component 635 may be configured as or otherwise support a means for transmitting a second channel state information report for the non-dominant spatial layer according to the second feedback reporting periodicity.

Additionally or alternatively, the communications manager 620 may support wireless communications at a UE in accordance with examples as disclosed herein. The CSI configuration receiving component 625 may be configured as or otherwise support a means for receiving, from a base station, a channel state information configuration indicating a first codebook for a dominant spatial layer and a second codebook for a non-dominant spatial layer, where the first codebook is different than the second codebook. The non-dominant CSI report component 635 may be configured as or otherwise support a means for transmitting a first channel state information report for the non-dominant spatial layer based on the second codebook. The dominant CSI report triggering component 640 may be configured as or otherwise support a means for receiving a first downlink control information configuring the UE to report channel state information for the dominant spatial layer and the non-dominant spatial layer. The dominant CSI report component 630 may be configured as or otherwise support a means for transmitting a second channel state information report for the non-dominant spatial layer and the dominant spatial layer based on the first codebook and the second codebook.

Figure 7:
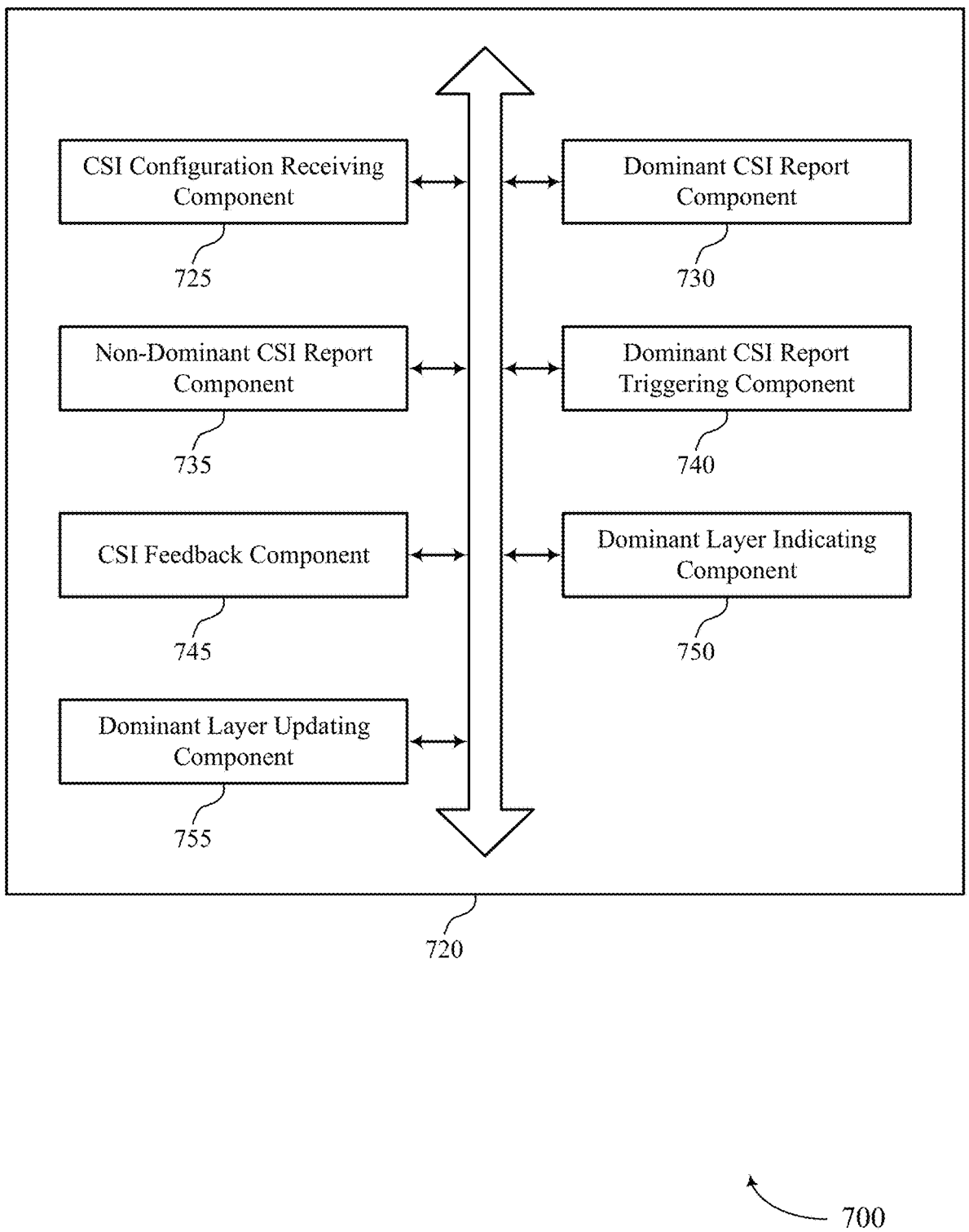
FIG. 7 shows a block diagram of a communications manager that supports layer-specific feedback periodicity in accordance with aspects of the present disclosure.

FIG. 7 shows a block diagram 700 of a communications manager 720 that supports layer-specific feedback periodicity in accordance with aspects of the present disclosure. The communications manager 720 may be an example of aspects of a communications manager 520, a communications manager 620, or both, as described herein. The communications manager 720, or various components thereof, may be an example of means for performing various aspects of layer-specific feedback periodicity as described herein. For example, the communications manager 720 may include a CSI configuration receiving component 725, a dominant CSI report component 730, a non-dominant CSI report component 735, a dominant CSI report triggering component 740, a CSI feedback component 745, a dominant layer indicating component 750, a dominant layer updating component 755, or any combination thereof. Each of these components may communicate, directly or indirectly, with one another (e.g., via one or more buses).

The communications manager 720 may support wireless communications at a UE in accordance with examples as disclosed herein. The CSI configuration receiving component 725 may be configured as or otherwise support a means for receiving, from a base station, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The dominant CSI report component 730 may be configured as or otherwise support a means for transmitting a first channel state information report for at least the dominant spatial layer according to the first feedback reporting periodicity. The non-dominant CSI report component 735 may be configured as or otherwise support a means for transmitting a second channel state information report for the non-dominant spatial layer according to the second feedback reporting periodicity.

In some examples, the CSI feedback component 745 may be configured as or otherwise support a means for receiving downlink control information based on transmitting the first channel state information report, the downlink control information including acknowledgment feedback for the first channel state information report.

In some examples, to support receiving the channel state information configuration, the CSI configuration receiving component 725 may be configured as or otherwise support a means for receiving the channel state information configuration indicating a first codebook for the dominant spatial layer and a second codebook for the non-dominant spatial layer. In some examples, the first codebook is different than the second codebook.

In some examples, the dominant layer indicating component 750 may be configured as or otherwise support a means for transmitting, to the base station, a precoding matrix indicator report including a layer indicator corresponding to the dominant spatial layer.

In some examples, the dominant layer indicating component 750 may be configured as or otherwise support a means for transmitting, to the base station, a precoding matrix indicator report indicating that one or more spatial layers are dominant spatial layers, where the one or more spatial layers are indicated based on a rank indicator of the precoding matrix indicator report. In some examples, a quantity of the one or more spatial layers is based on a value of the rank indicator.

In some examples, the first channel state information report includes either channel state information for just the dominant spatial layer or a full layer report for each spatial layer based on the channel state information configuration. In some examples, the second channel state information report includes channel quality information for the non-dominant spatial layer and the dominant spatial layer.

In some examples, the dominant layer updating component 755 may be configured as or otherwise support a means for determining an updated precoder for the dominant spatial layer. In some examples, the dominant layer updating component 755 may be configured as or otherwise support a means for transmitting uplink control information to the base station indicating the updated precoder for the dominant spatial layer, where an indicator in the uplink control information indicates that the updated precoder is included in the uplink control information.

In some examples, the first feedback reporting periodicity for the non-dominant spatial layer is smaller than the second feedback reporting periodicity for the dominant spatial layer.

Additionally or alternatively, the communications manager 720 may support wireless communications at a UE in accordance with examples as disclosed herein. In some examples, the CSI configuration receiving component 725 may be configured as or otherwise support a means for receiving, from a base station, a channel state information configuration indicating a first codebook for a dominant spatial layer and a second codebook for a non-dominant spatial layer, where the first codebook is different than the second codebook. In some examples, the non-dominant CSI report component 735 may be configured as or otherwise support a means for transmitting a first channel state information report for the non-dominant spatial layer based on the second codebook. The dominant CSI report triggering component 740 may be configured as or otherwise support a means for receiving a first downlink control information configuring the UE to report channel state information for the dominant spatial layer and the non-dominant spatial layer. In some examples, the dominant CSI report component 730 may be configured as or otherwise support a means for transmitting a second channel state information report for the non-dominant spatial layer and the dominant spatial layer based on the first codebook and the second codebook.

In some examples, the dominant CSI report triggering component 740 may be configured as or otherwise support a means for receiving, from the base station, a second downlink control information configuring the UE to disable reporting channel state information for the dominant spatial layer.

In some examples, the CSI feedback component 745 may be configured as or otherwise support a means for receiving downlink control information based on transmitting the second channel state information report, the downlink control information including acknowledgment feedback for the first channel state information report and the second channel state information report.

In some examples, the dominant layer indicating component 750 may be configured as or otherwise support a means for transmitting, to the base station, a precoding matrix indicator report including a layer indicator corresponding to the dominant spatial layer. In some examples, the dominant layer indicating component 750 may be configured as or otherwise support a means for transmitting, to the base station, a precoding matrix indicator report indicating that one or more layers are dominant spatial layers, where the one or more layers are indicated based on a rank indicator of the precoding matrix indicator report. In some examples, the first channel state information report includes channel quality information for the non-dominant spatial layer and the dominant spatial layer.

In some examples, the dominant layer updating component 755 may be configured as or otherwise support a means for determining an updated precoder for the dominant spatial layer. In some examples, the dominant layer updating component 755 may be configured as or otherwise support a means for transmitting uplink control information to the base station to indicate the updated precoder for the dominant spatial layer, where an indicator in the uplink control information indicates that the updated precoder is included in the uplink control information.

Figure 8:
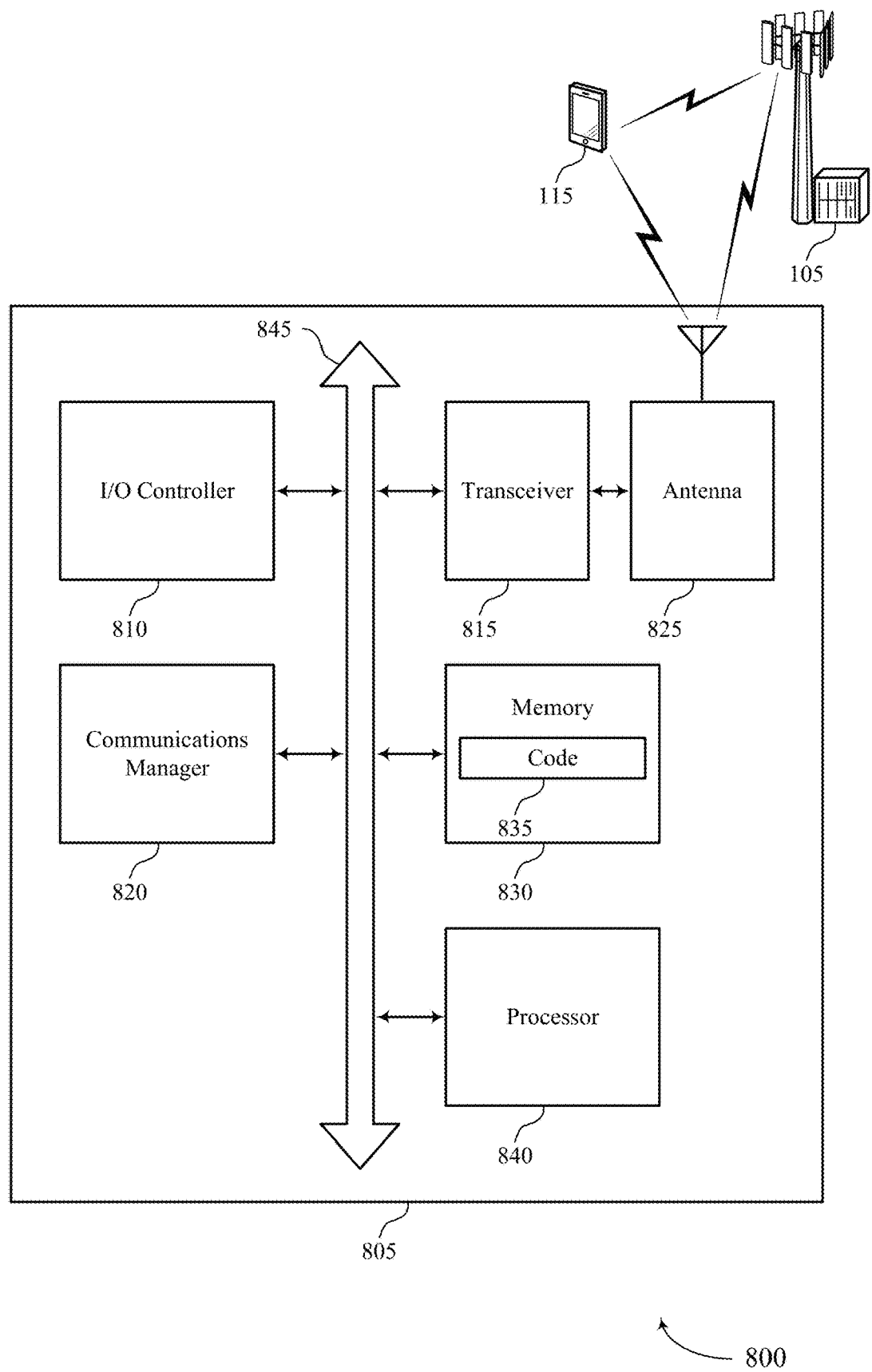
FIG. 8 shows a diagram of a system including a device that supports layer-specific feedback periodicity in accordance with aspects of the present disclosure.

FIG. 8 shows a diagram of a system 800 including a device 805 that supports layer-specific feedback periodicity in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting layer-specific feedback periodicity). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The communications manager 820 may be configured as or otherwise support a means for transmitting a first channel state information report for at least the dominant spatial layer according to the first feedback reporting periodicity. The communications manager 820 may be configured as or otherwise support a means for transmitting a second channel state information report for the non-dominant spatial layer according to the second feedback reporting periodicity.

Additionally or alternatively, the communications manager 820 may support wireless communications at a UE in accordance with examples as disclosed herein. For example, the communications manager 820 may be configured as or otherwise support a means for receiving, from a base station, a channel state information configuration indicating a first codebook for a dominant spatial layer and a second codebook for a non-dominant spatial layer, where the first codebook is different than the second codebook. The communications manager 820 may be configured as or otherwise support a means for transmitting a first channel state information report for the non-dominant spatial layer based on the second codebook. The communications manager 820 may be configured as or otherwise support a means for receiving a first downlink control information configuring the UE to report channel state information for the dominant spatial layer and the non-dominant spatial layer. The communications manager 820 may be configured as or otherwise support a means for transmitting a second channel state information report for the non-dominant spatial layer and the dominant spatial layer based on the first codebook and the second codebook.

By including or configuring the communications manager 820 in accordance with examples as described herein, the device 805 may support techniques for more efficient resource usage. For example, by configuring different periodicities for dominant and non-dominant spatial layers, a UE 115 may less frequently report CSI for dominant spatial layers. This may reduce an amount of overhead (e.g., resources used) at the UE 115 to report CSI.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of layer-specific feedback periodicity as described herein, or the processor 840 and the memory 830 may be otherwise configured to perform or support such operations.

Figure 9:
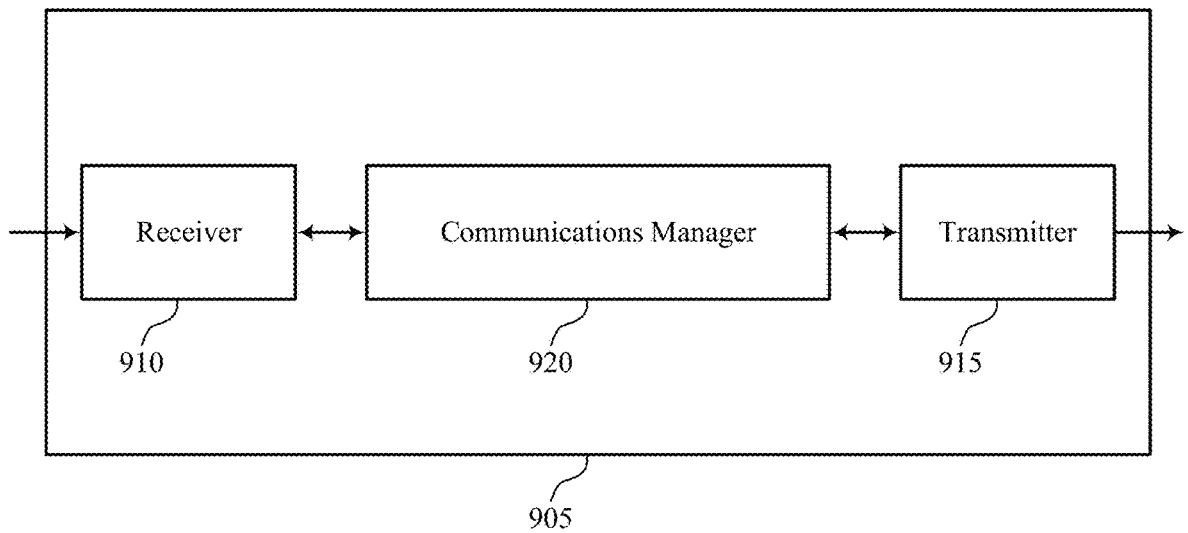
FIGS. 9 and 10 show block diagrams of devices that support layer-specific feedback periodicity in accordance with aspects of the present disclosure.

FIG. 9 shows a block diagram 900 of a device 905 that supports layer-specific feedback periodicity in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to layer-specific feedback periodicity). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to layer-specific feedback periodicity). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of layer-specific feedback periodicity as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The communications manager 920 may be configured as or otherwise support a means for receiving a first channel state information report for at least the dominant spatial layer according to the first feedback reporting periodicity. The communications manager 920 may be configured as or otherwise support a means for receiving a second channel state information report for at least the non-dominant spatial layer according to the second feedback reporting periodicity.

Additionally or alternatively, the communications manager 920 may support wireless communications at a base station in accordance with examples as disclosed herein. For example, the communications manager 920 may be configured as or otherwise support a means for transmitting, to a UE, a channel state information configuration indicating a first codebook for a dominant spatial layer and a second codebook for a non-dominant spatial layer, where the first codebook is different than the second codebook. The communications manager 920 may be configured as or otherwise support a means for receiving a first channel state information report for the non-dominant spatial layer based on the second codebook. The communications manager 920 may be configured as or otherwise support a means for transmitting a first downlink control information configuring the UE to report channel state information for the dominant spatial layer and the non-dominant spatial layer. The communications manager 920 may be configured as or otherwise support a means for receiving a second channel state information report for the non-dominant spatial layer and the dominant spatial layer based on the first codebook and the second codebook.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources by reducing a rate at which CSI is reported for dominant spatial layers for both periodic and aperiodic CSI reporting schemes.

Figure 10:
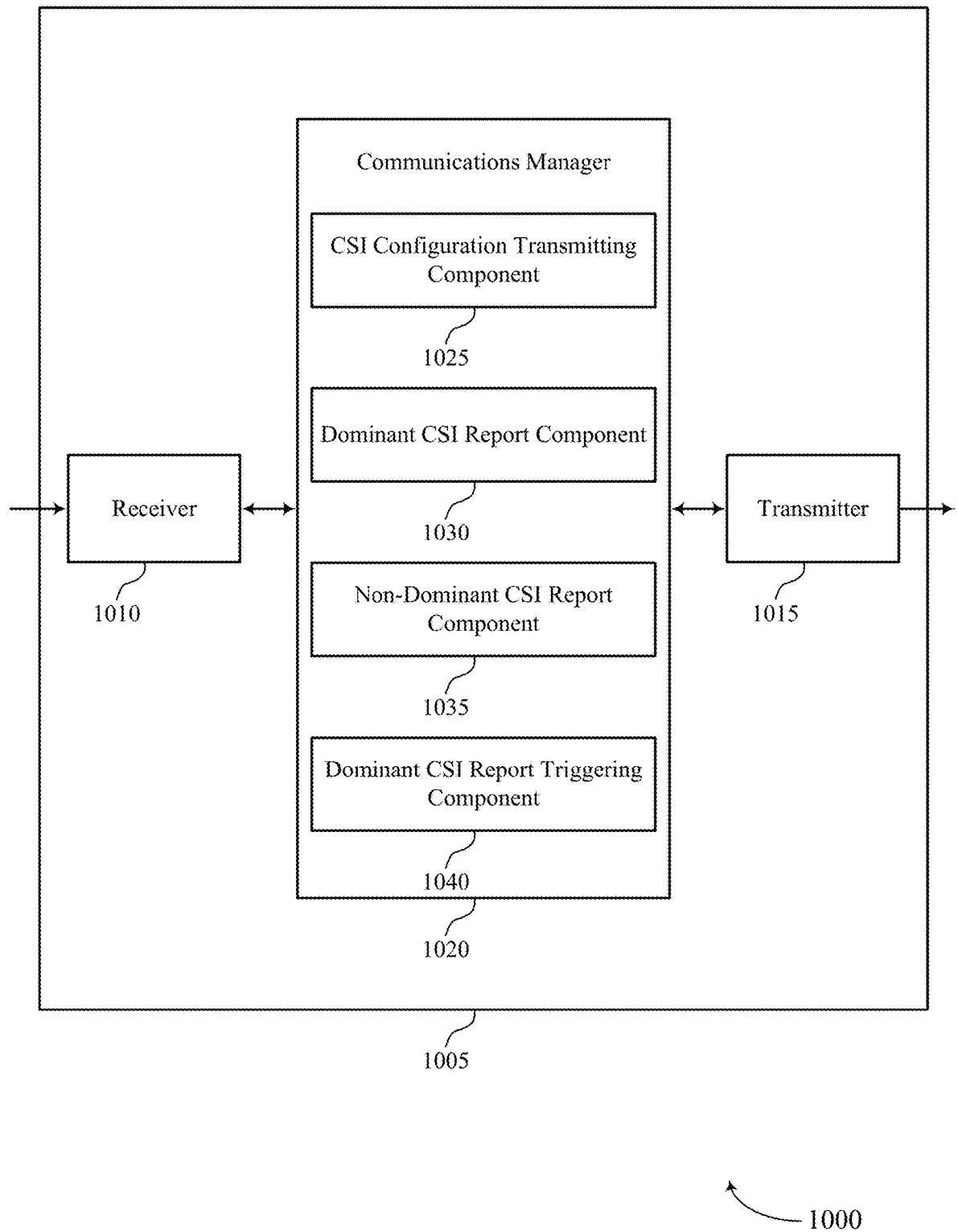

FIG. 10 shows a block diagram 1000 of a device 1005 that supports layer-specific feedback periodicity in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to layer-specific feedback periodicity). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to layer-specific feedback periodicity). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of layer-specific feedback periodicity as described herein. For example, the communications manager 1020 may include a CSI configuration transmitting component 1025, a dominant CSI report component 1030, a non-dominant CSI report component 1035, a dominant CSI report triggering component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The CSI configuration transmitting component 1025 may be configured as or otherwise support a means for transmitting, to a UE, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The dominant CSI report component 1030 may be configured as or otherwise support a means for receiving a first channel state information report for at least the dominant spatial layer according to the first feedback reporting periodicity. The non-dominant CSI report component 1035 may be configured as or otherwise support a means for receiving a second channel state information report for at least the non-dominant spatial layer according to the second feedback reporting periodicity.

Additionally or alternatively, the communications manager 1020 may support wireless communications at a base station in accordance with examples as disclosed herein. The CSI configuration transmitting component 1025 may be configured as or otherwise support a means for transmitting, to a UE, a channel state information configuration indicating a first codebook for a dominant spatial layer and a second codebook for a non-dominant spatial layer, where the first codebook is different than the second codebook. The non-dominant CSI report component 1035 may be configured as or otherwise support a means for receiving a first channel state information report for the non-dominant spatial layer based on the second codebook. The dominant CSI report triggering component 1040 may be configured as or otherwise support a means for transmitting a first downlink control information configuring the UE to report channel state information for the dominant spatial layer and the non-dominant spatial layer. The dominant CSI report component 1030 may be configured as or otherwise support a means for receiving a second channel state information report for the non-dominant spatial layer and the dominant spatial layer based on the first codebook and the second codebook.

Figure 11:
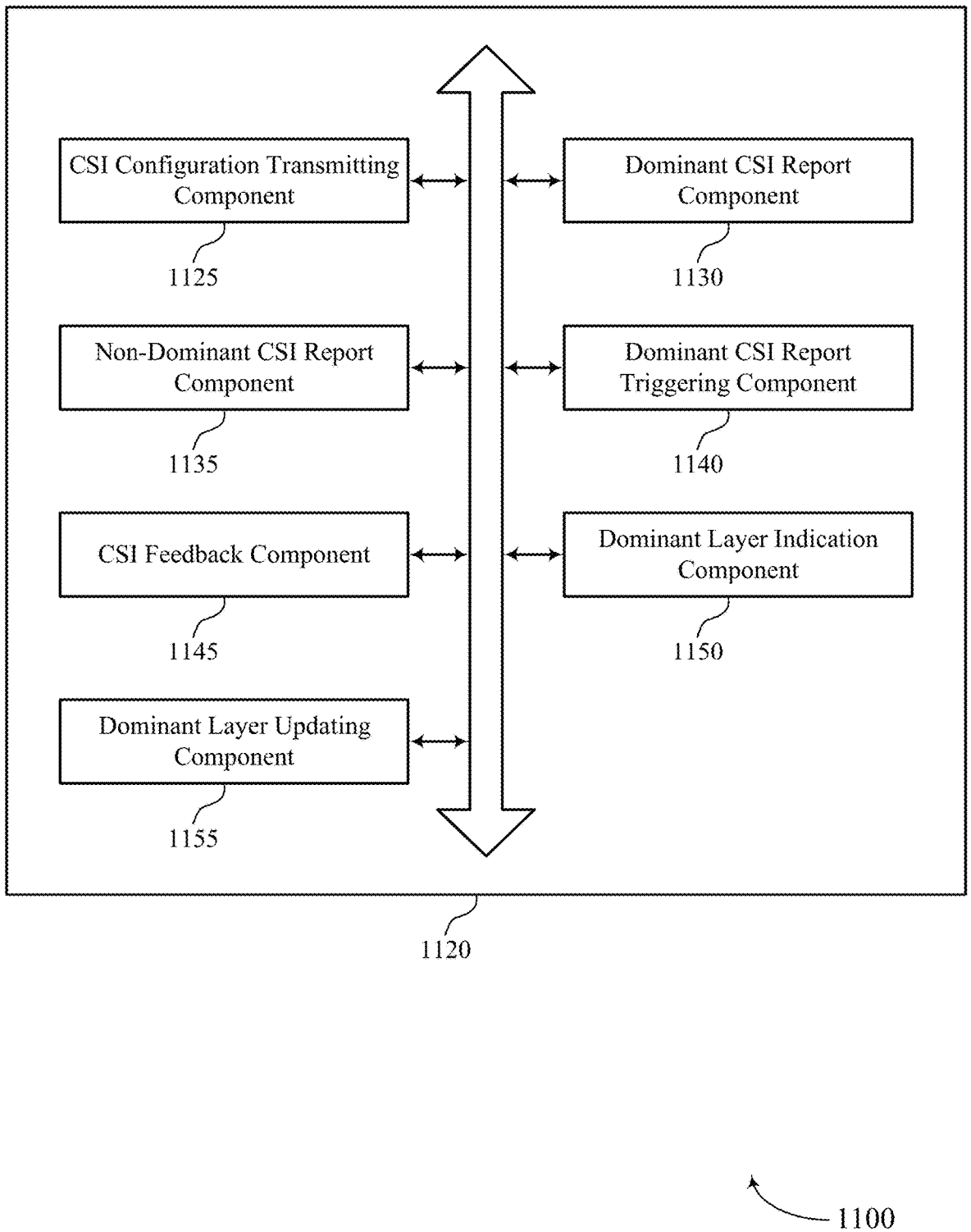
FIG. 11 shows a block diagram of a communications manager that supports layer-specific feedback periodicity in accordance with aspects of the present disclosure.

FIG. 11 shows a block diagram 1100 of a communications manager 1120 that supports layer-specific feedback periodicity in accordance with aspects of the present disclosure. The communications manager 1120 may be an example of aspects of a communications manager 920, a communications manager 1020, or both, as described herein. The communications manager 1120, or various components thereof, may be an example of means for performing various aspects of layer-specific feedback periodicity as described herein. For example, the communications manager 1120 may include a CSI configuration transmitting component 1125, a dominant CSI report component 1130, a non-dominant CSI report component 1135, a dominant CSI report triggering component 1140, a CSI feedback component 1145, a dominant layer indication component 1150, a dominant layer updating component 1155, or any combination thereof. Each of these components may communicate, directly or indirectly, with one another (e.g., via one or more buses).

The communications manager 1120 may support wireless communications at a base station in accordance with examples as disclosed herein. The CSI configuration transmitting component 1125 may be configured as or otherwise support a means for transmitting, to a UE, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The dominant CSI report component 1130 may be configured as or otherwise support a means for receiving a first channel state information report for at least the dominant spatial layer according to the first feedback reporting periodicity. The non-dominant CSI report component 1135 may be configured as or otherwise support a means for receiving a second channel state information report for at least the non-dominant spatial layer according to the second feedback reporting periodicity.

In some examples, the CSI feedback component 1145 may be configured as or otherwise support a means for transmitting downlink control information based on receiving the first channel state information report, the downlink control information including acknowledgment feedback for the first channel state information report.

In some examples, the CSI configuration transmitting component 1125 may be configured as or otherwise support a means for transmitting the channel state information configuration indicating a first codebook for the dominant spatial layer and a second codebook for the non-dominant spatial layer.

In some examples, the first codebook is different than the second codebook.

In some examples, the dominant layer indication component 1150 may be configured as or otherwise support a means for receiving, from the UE, a precoding matrix indicator report including a layer indicator corresponding to the dominant spatial layer.

In some examples, the dominant layer indication component 1150 may be configured as or otherwise support a means for receiving, from the UE, a precoding matrix indicator report indicating that one or more spatial layers are dominant spatial layers, where the one or more spatial layers are indicated based on a rank indicator of the precoding matrix indicator report. In some examples, a quantity of the one or more spatial layers is based on a value of the rank indicator. In some examples, the first channel state information report includes channel quality information for the non-dominant spatial layer and the dominant spatial layer.

In some examples, the dominant layer updating component 1155 may be configured as or otherwise support a means for receiving uplink control information from the UE, where the uplink control information indicates an updated precoder for the dominant spatial layer, where an indicator in the uplink control information indicates that the updated precoder is included in the uplink control information.

Additionally or alternatively, the communications manager 1120 may support wireless communications at a base station in accordance with examples as disclosed herein. In some examples, the CSI configuration transmitting component 1125 may be configured as or otherwise support a means for transmitting, to a UE, a channel state information configuration indicating a first codebook for a dominant spatial layer and a second codebook for a non-dominant spatial layer, where the first codebook is different than the second codebook. In some examples, the non-dominant CSI report component 1135 may be configured as or otherwise support a means for receiving a first channel state information report for the non-dominant spatial layer based on the second codebook. The dominant CSI report triggering component 1140 may be configured as or otherwise support a means for transmitting a first downlink control information configuring the UE to report channel state information for the dominant spatial layer and the non-dominant spatial layer. In some examples, the dominant CSI report component 1130 may be configured as or otherwise support a means for receiving a second channel state information report for the non-dominant spatial layer and the dominant spatial layer based on the first codebook and the second codebook.

In some examples, the dominant CSI report triggering component 1140 may be configured as or otherwise support a means for transmitting, to the UE, a second downlink control information configuring the UE to disable reporting channel state information for the dominant spatial layer.

In some examples, the CSI feedback component 1145 may be configured as or otherwise support a means for transmitting downlink control information based on receiving the second channel state information report, the downlink control information including acknowledgment feedback for the first channel state information report and the second channel state information report.

Figure 12:
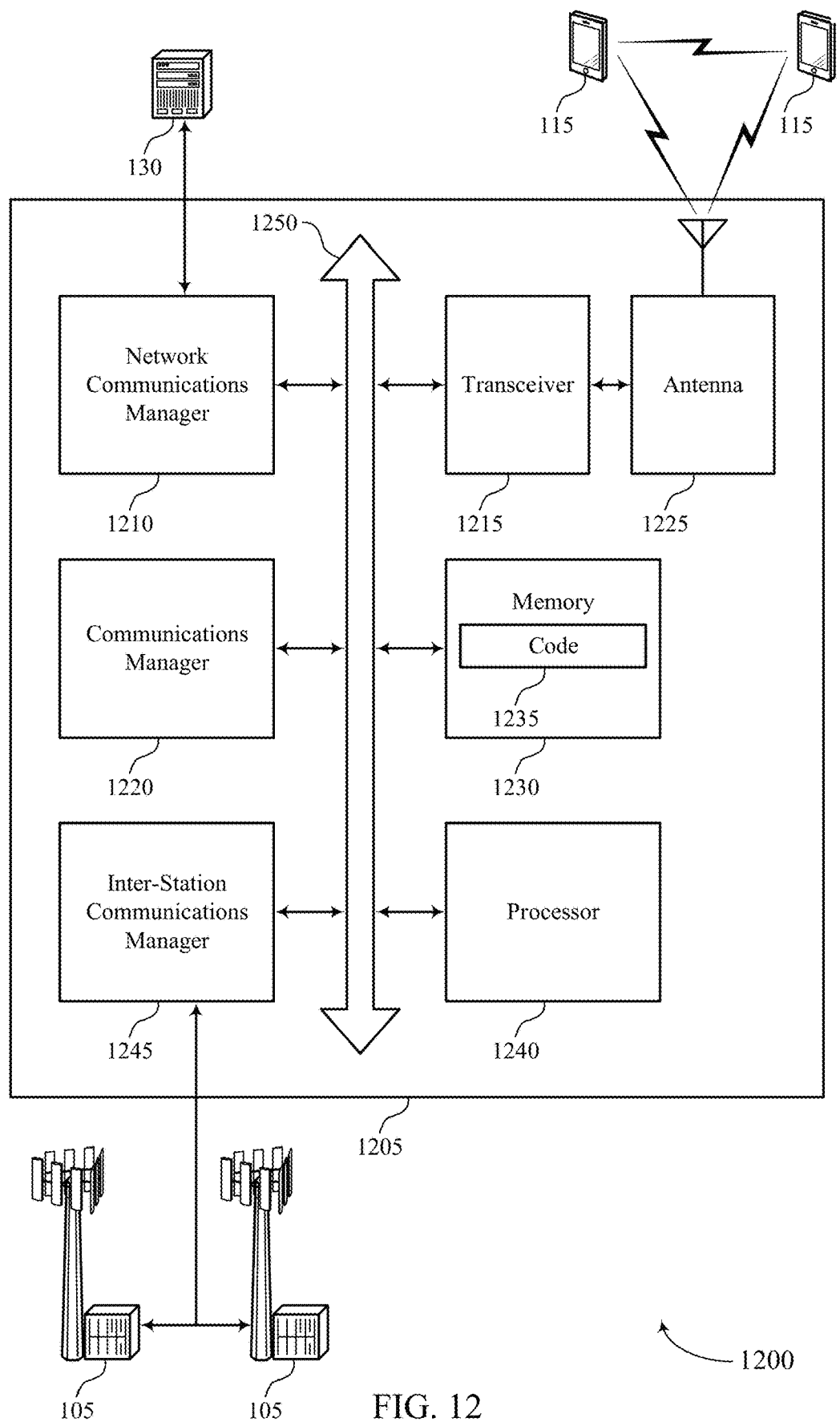
FIG. 12 shows a diagram of a system including a device that supports layer-specific feedback periodicity in accordance with aspects of the present disclosure.

FIG. 12 shows a diagram of a system 1200 including a device 1205 that supports layer-specific feedback periodicity in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting layer-specific feedback periodicity). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The communications manager 1220 may be configured as or otherwise support a means for receiving a first channel state information report for at least the dominant spatial layer according to the first feedback reporting periodicity. The communications manager 1220 may be configured as or otherwise support a means for receiving a second channel state information report for at least the non-dominant spatial layer according to the second feedback reporting periodicity.

Additionally or alternatively, the communications manager 1220 may support wireless communications at a base station in accordance with examples as disclosed herein. For example, the communications manager 1220 may be configured as or otherwise support a means for transmitting, to a UE, a channel state information configuration indicating a first codebook for a dominant spatial layer and a second codebook for a non-dominant spatial layer, where the first codebook is different than the second codebook. The communications manager 1220 may be configured as or otherwise support a means for receiving a first channel state information report for the non-dominant spatial layer based on the second codebook. The communications manager 1220 may be configured as or otherwise support a means for transmitting a first downlink control information configuring the UE to report channel state information for the dominant spatial layer and the non-dominant spatial layer. The communications manager 1220 may be configured as or otherwise support a means for receiving a second channel state information report for the non-dominant spatial layer and the dominant spatial layer based on the first codebook and the second codebook.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of layer-specific feedback periodicity as described herein, or the processor 1240 and the memory 1230 may be otherwise configured to perform or support such operations.

Figure 13:
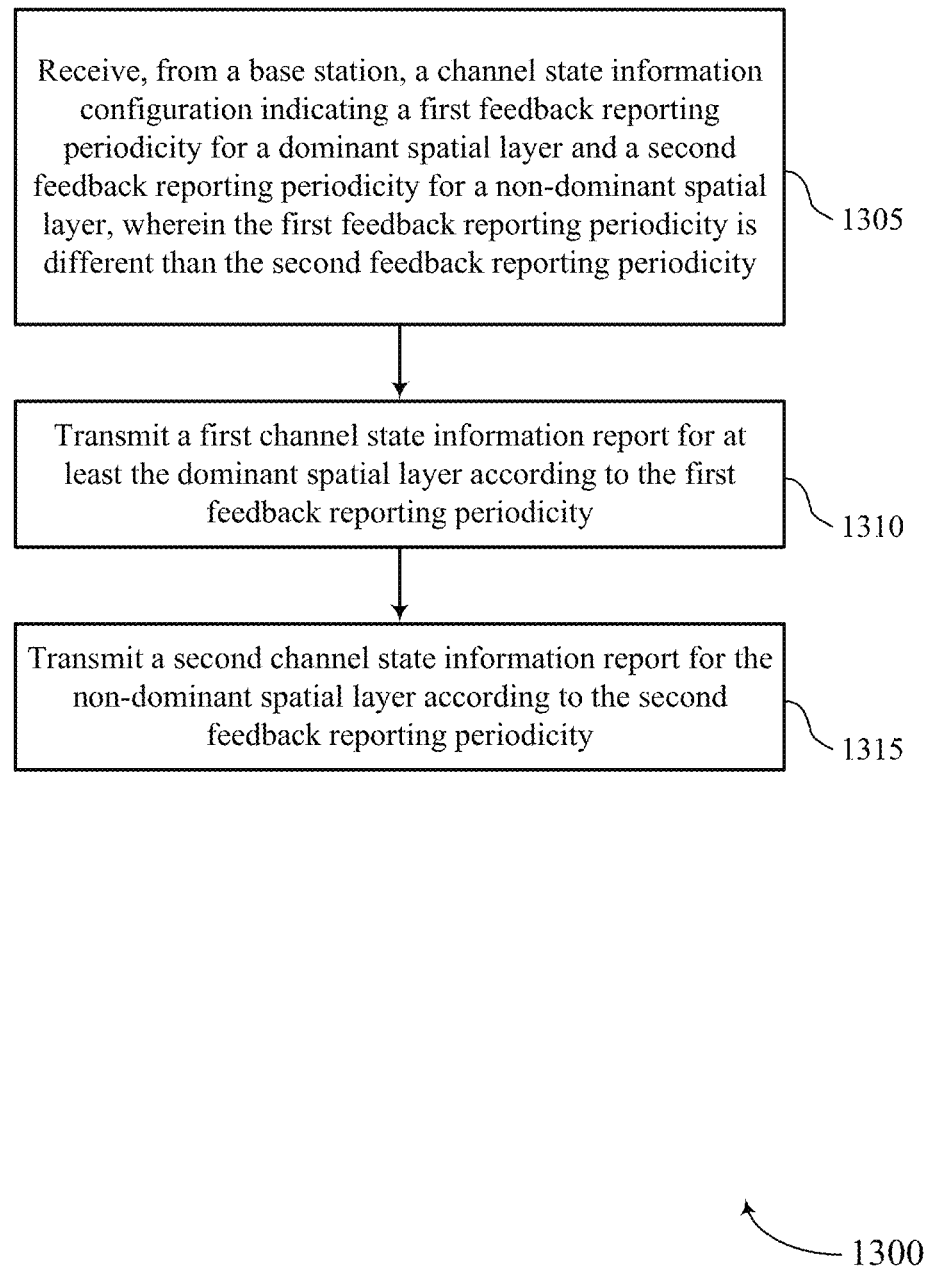
FIGS. 13 through 18 show flowcharts illustrating methods that support layer-specific feedback periodicity in accordance with aspects of the present disclosure.

FIG. 13 shows a flowchart illustrating a method 1300 that supports layer-specific feedback periodicity in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The operations of 1305 may be performed in accordance with examples as disclosed herein. In some examples, aspects of the operations of 1305 may be performed by a CSI configuration receiving component 725 as described with reference to FIG. 7.

At 1310, the method may include transmitting a first channel state information report for at least the dominant spatial layer according to the first feedback reporting periodicity. The operations of 1310 may be performed in accordance with examples as disclosed herein. In some examples, aspects of the operations of 1310 may be performed by a dominant CSI report component 730 as described with reference to FIG. 7.

At 1315, the method may include transmitting a second channel state information report for the non-dominant spatial layer according to the second feedback reporting periodicity. The operations of 1315 may be performed in accordance with examples as disclosed herein. In some examples, aspects of the operations of 1315 may be performed by a non-dominant CSI report component 735 as described with reference to FIG. 7.

Figure 14:
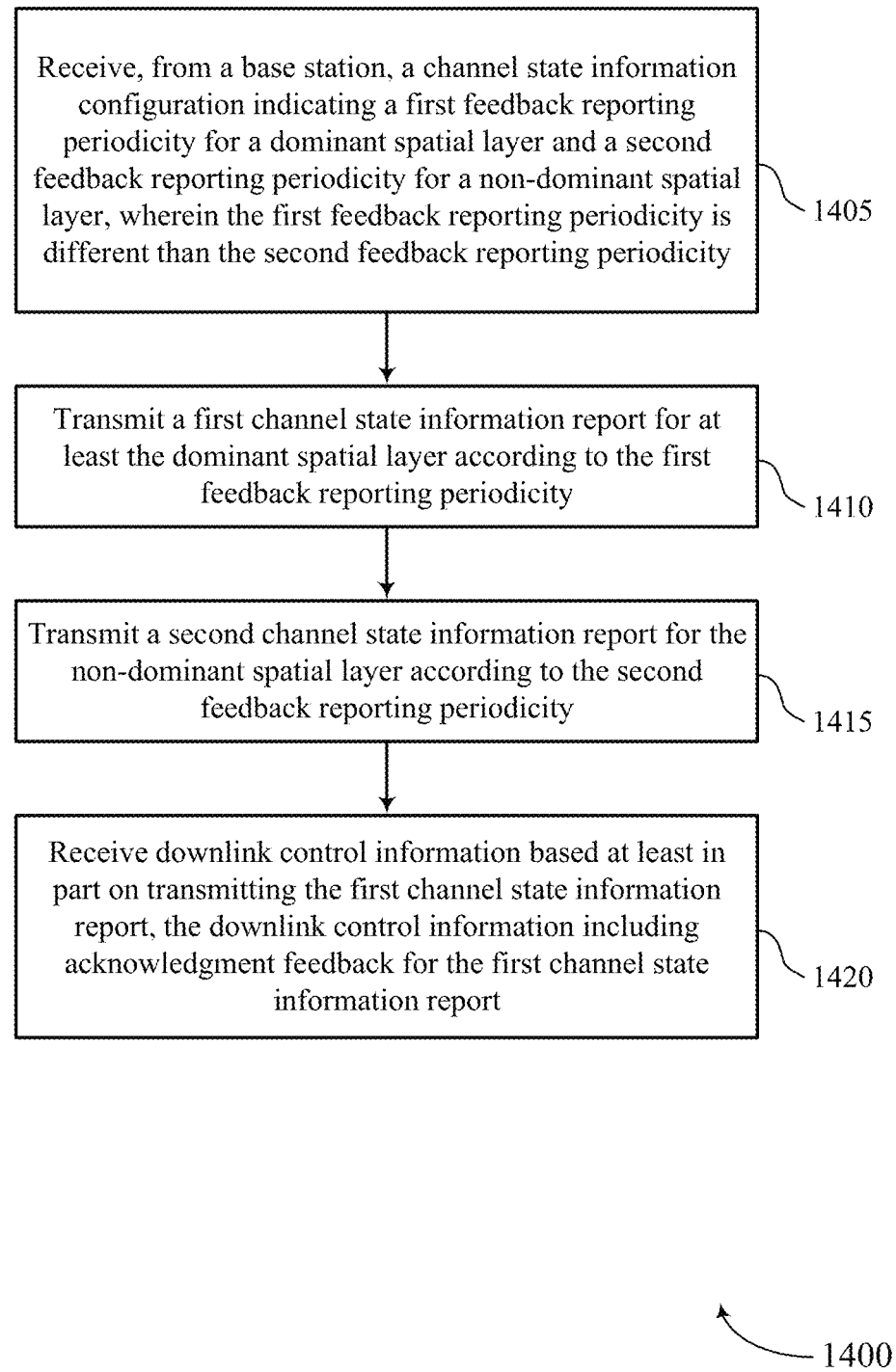

FIG. 14 shows a flowchart illustrating a method 1400 that supports layer-specific feedback periodicity in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The operations of 1405 may be performed in accordance with examples as disclosed herein. In some examples, aspects of the operations of 1405 may be performed by a CSI configuration receiving component 725 as described with reference to FIG. 7.

At 1410, the method may include transmitting a first channel state information report for at least the dominant spatial layer according to the first feedback reporting periodicity. The operations of 1410 may be performed in accordance with examples as disclosed herein. In some examples, aspects of the operations of 1410 may be performed by a dominant CSI report component 730 as described with reference to FIG. 7.

At 1415, the method may include transmitting a second channel state information report for the non-dominant spatial layer according to the second feedback reporting periodicity. The operations of 1415 may be performed in accordance with examples as disclosed herein. In some examples, aspects of the operations of 1415 may be performed by a non-dominant CSI report component 735 as described with reference to FIG. 7.

At 1420, the method may include receiving downlink control information based on transmitting the first channel state information report, the downlink control information including acknowledgment feedback for the first channel state information report. The operations of 1420 may be performed in accordance with examples as disclosed herein. In some examples, aspects of the operations of 1420 may be performed by a CSI feedback component 745 as described with reference to FIG. 7.

Figure 15:
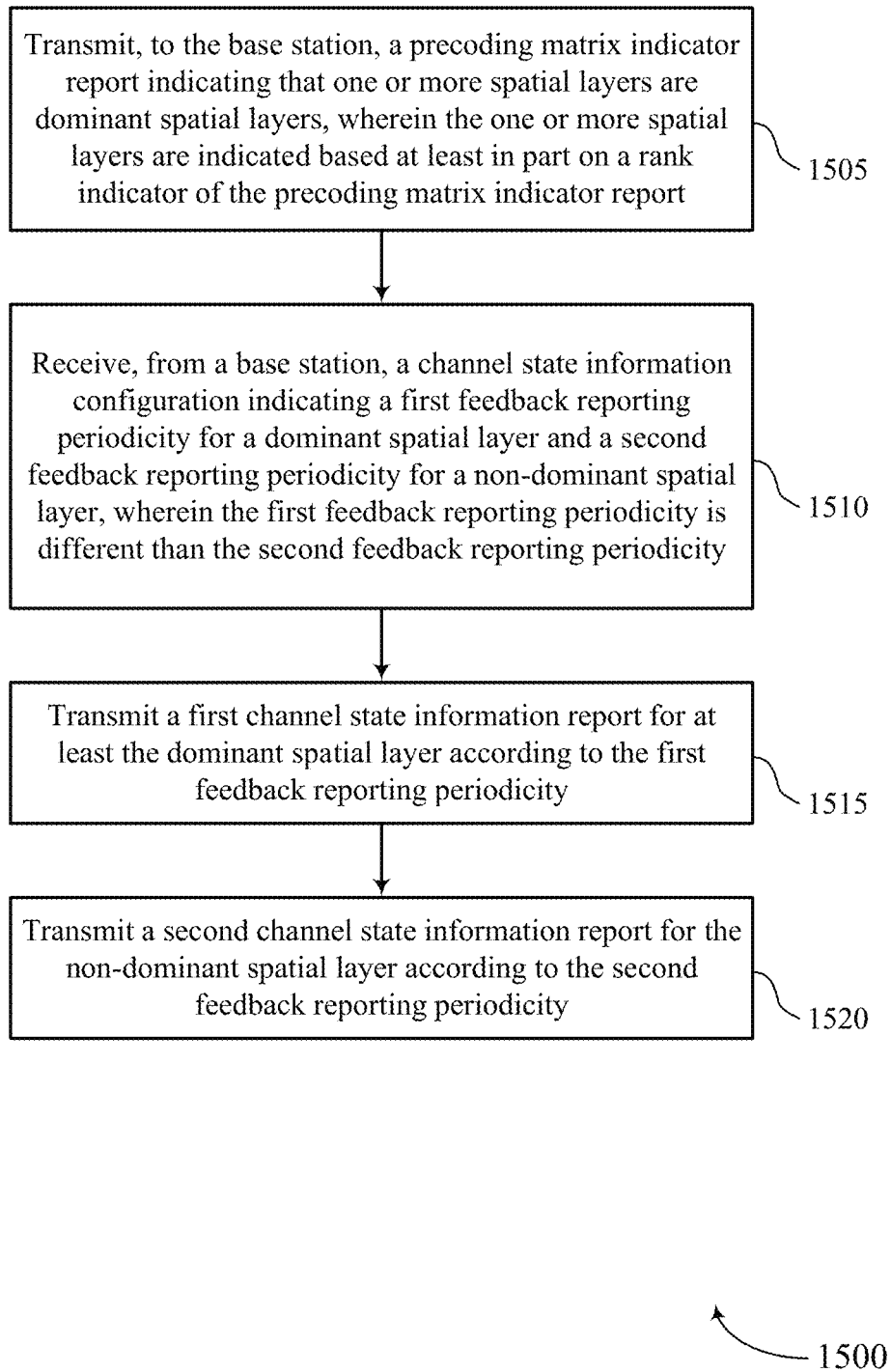

FIG. 15 shows a flowchart illustrating a method 1500 that supports layer-specific feedback periodicity in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to the base station, a precoding matrix indicator report indicating that one or more spatial layers are dominant spatial layers, where the one or more spatial layers are indicated based on a rank indicator of the precoding matrix indicator report. The operations of 1505 may be performed in accordance with examples as disclosed herein. In some examples, aspects of the operations of 1505 may be performed by a dominant layer indicating component 750 as described with reference to FIG. 7.

At 1510, the method may include receiving, from a base station, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The operations of 1510 may be performed in accordance with examples as disclosed herein. In some examples, aspects of the operations of 1510 may be performed by a CSI configuration receiving component 725 as described with reference to FIG. 7.

At 1515, the method may include transmitting a first channel state information report for at least the dominant spatial layer according to the first feedback reporting periodicity. The operations of 1515 may be performed in accordance with examples as disclosed herein. In some examples, aspects of the operations of 1515 may be performed by a dominant CSI report component 730 as described with reference to FIG. 7.

At 1520, the method may include transmitting a second channel state information report for the non-dominant spatial layer according to the second feedback reporting periodicity. The operations of 1520 may be performed in accordance with examples as disclosed herein. In some examples, aspects of the operations of 1520 may be performed by a non-dominant CSI report component 735 as described with reference to FIG. 7.

Figure 16:
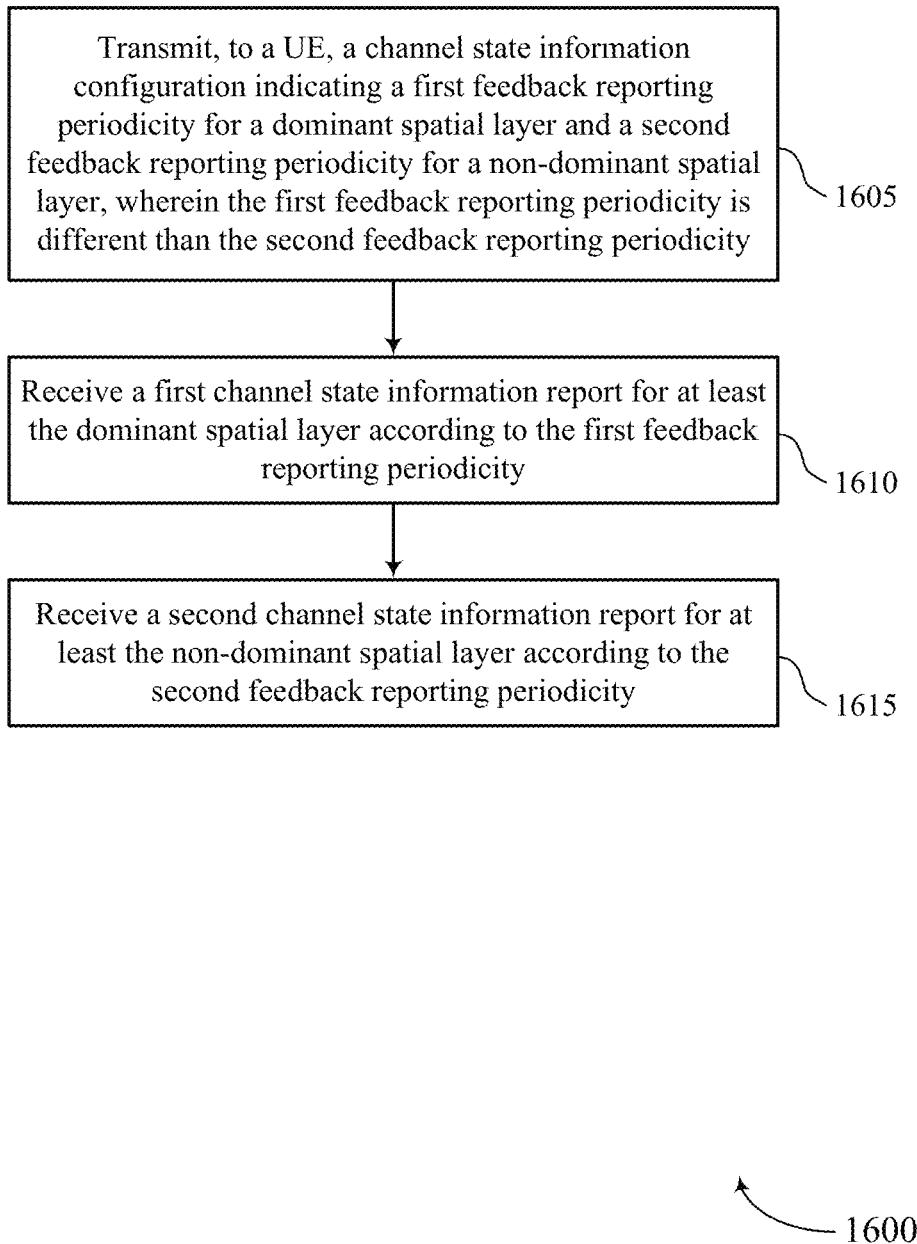

FIG. 16 shows a flowchart illustrating a method 1600 that supports layer-specific feedback periodicity in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a channel state information configuration indicating a first feedback reporting periodicity for a dominant spatial layer and a second feedback reporting periodicity for a non-dominant spatial layer, where the first feedback reporting periodicity is different than the second feedback reporting periodicity. The operations of 1605 may be performed in accordance with examples as disclosed herein. In some examples, aspects of the operations of 1605 may be performed by a CSI configuration transmitting component 1125 as described with reference to FIG. 11.

At 1610, the method may include receiving a first channel state information report for at least the dominant spatial layer according to the first feedback reporting periodicity. The operations of 1610 may be performed in accordance with examples as disclosed herein. In some examples, aspects of the operations of 1610 may be performed by a dominant CSI report component 1130 as described with reference to FIG. 11.

At 1615, the method may include receiving a second channel state information report for at least the non-dominant spatial layer according to the second feedback reporting periodicity. The operations of 1615 may be performed in accordance with examples as disclosed herein. In some examples, aspects of the operations of 1615 may be performed by a non-dominant CSI report component 1135 as described with reference to FIG. 11.

Figure 17:
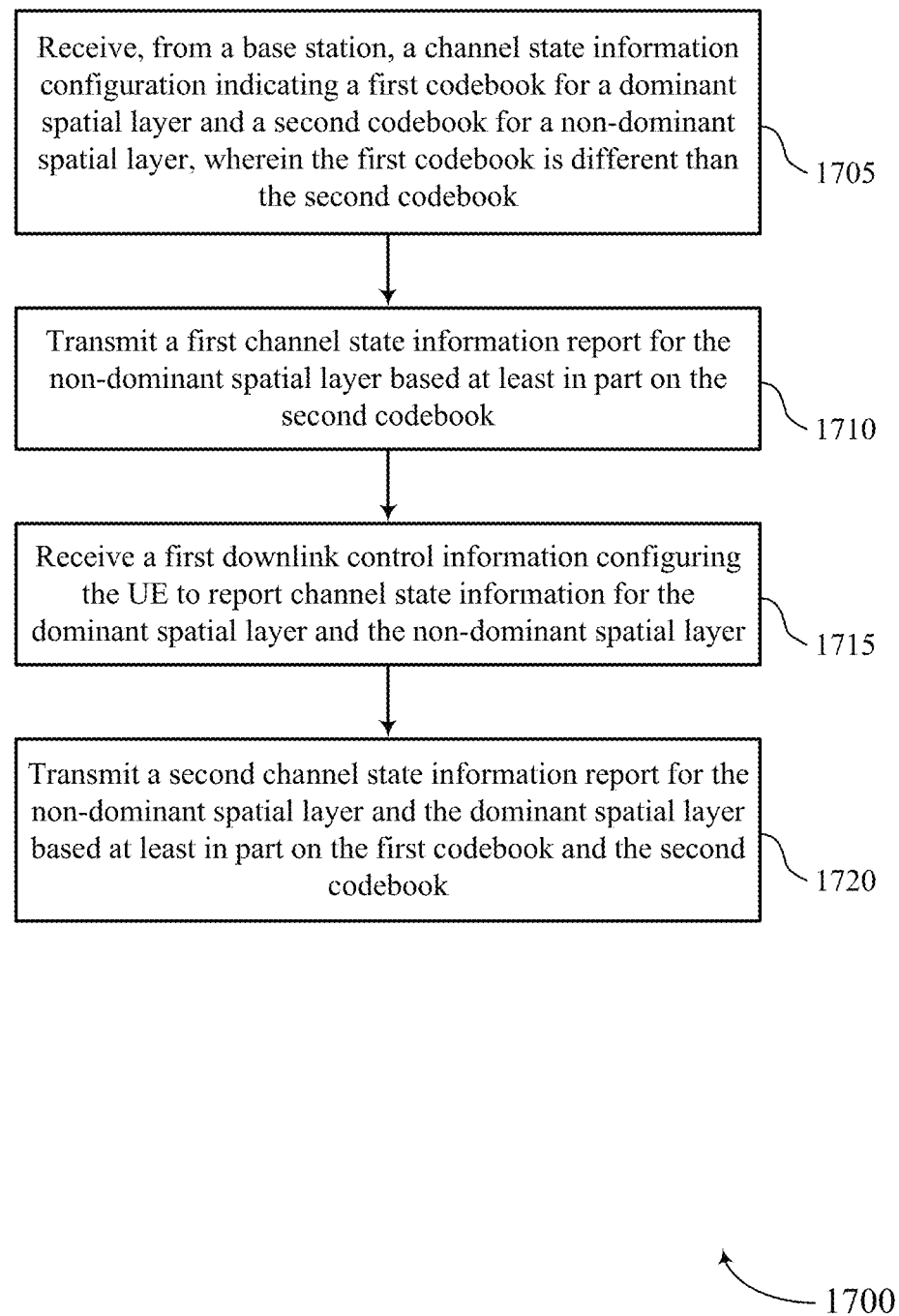

FIG. 17 shows a flowchart illustrating a method 1700 that supports layer-specific feedback periodicity in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a channel state information configuration indicating a first codebook for a dominant spatial layer and a second codebook for a non-dominant spatial layer, where the first codebook is different than the second codebook. The operations of 1705 may be performed in accordance with examples as disclosed herein. In some examples, aspects of the operations of 1705 may be performed by a CSI configuration receiving component 725 as described with reference to FIG. 7.

At 1710, the method may include transmitting a first channel state information report for the non-dominant spatial layer based on the second codebook. The operations of 1710 may be performed in accordance with examples as disclosed herein. In some examples, aspects of the operations of 1710 may be performed by a non-dominant CSI report component 735 as described with reference to FIG. 7.

At 1715, the method may include receiving a first downlink control information configuring the UE to report channel state information for the dominant spatial layer and the non-dominant spatial layer. The operations of 1715 may be performed in accordance with examples as disclosed herein. In some examples, aspects of the operations of 1715 may be performed by a dominant CSI report triggering component 740 as described with reference to FIG. 7.

At 1720, the method may include transmitting a second channel state information report for the non-dominant spatial layer and the dominant spatial layer based on the first codebook and the second codebook. The operations of 1720 may be performed in accordance with examples as disclosed herein. In some examples, aspects of the operations of 1720 may be performed by a dominant CSI report component 730 as described with reference to FIG. 7.

Figure 18:
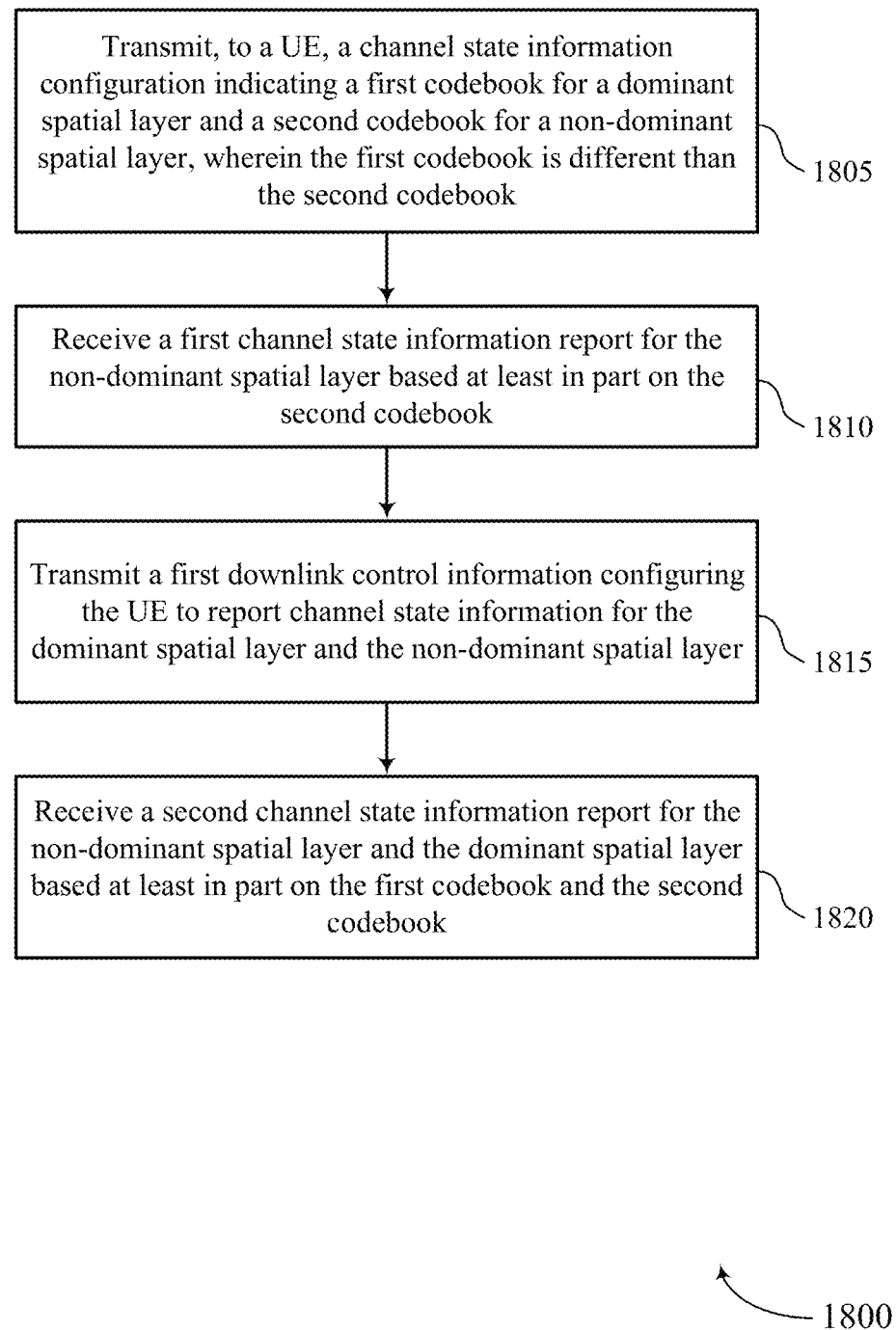

FIG. 18 shows a flowchart illustrating a method 1800 that supports layer-specific feedback periodicity in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, a channel state information configuration indicating a first codebook for a dominant spatial layer and a second codebook for a non-dominant spatial layer, where the first codebook is different than the second codebook. The operations of 1805 may be performed in accordance with examples as disclosed herein. In some examples, aspects of the operations of 1805 may be performed by a CSI configuration transmitting component 1125 as described with reference to FIG. 11.

At 1810, the method may include receiving a first channel state information report for the non-dominant spatial layer based on the second codebook. The operations of 1810 may be performed in accordance with examples as disclosed herein. In some examples, aspects of the operations of 1810 may be performed by a non-dominant CSI report component 1135 as described with reference to FIG. 11.

At 1815, the method may include transmitting a first downlink control information configuring the UE to report channel state information for the dominant spatial layer and the non-dominant spatial layer. The operations of 1815 may be performed in accordance with examples as disclosed herein. In some examples, aspects of the operations of 1815 may be performed by a dominant CSI report triggering component 1140 as described with reference to FIG. 11.

At 1820, the method may include receiving a second channel state information report for the non-dominant spatial layer and the dominant spatial layer based on the first codebook and the second codebook. The operations of 1820 may be performed in accordance with examples as disclosed herein. In some examples, aspects of the operations of 1820 may be performed by a dominant CSI report component 1130 as described with reference to FIG. 11.

The following provides an overview of aspects of the present disclosure:

Aspect 1: A method for wireless communications at a UE, comprising: receiving, from a base station, a channel state information configuration indicating a first feedback reporting periodicity for a dominant spatial layer and a second feedback reporting periodicity for a non-dominant spatial layer, wherein the first feedback reporting periodicity is different than the second feedback reporting periodicity; transmitting a first channel state information report for at least the dominant spatial layer according to the first feedback reporting periodicity; and transmitting a second channel state information report for the non-dominant spatial layer according to the second feedback reporting periodicity.

Aspect 2: The method of aspect 1, further comprising: receiving downlink control information based at least in part on transmitting the first channel state information report, the downlink control information including acknowledgment feedback for the first channel state information report.

Aspect 3: The method of any of aspects 1 through 2, wherein receiving the channel state information configuration comprises: receiving the channel state information configuration indicating a first codebook for the dominant spatial layer and a second codebook for the non-dominant spatial layer.

Aspect 4: The method of aspect 3, wherein the first codebook is different than the second codebook.

Aspect 5: The method of any of aspects 1 through 4, further comprising: transmitting, to the base station, a precoding matrix indicator report including a layer indicator corresponding to the dominant spatial layer.

Aspect 6: The method of any of aspects 1 through 4, further comprising: transmitting, to the base station, a precoding matrix indicator report indicating that one or more spatial layers are dominant spatial layers, wherein the one or more spatial layers are indicated based at least in part on a rank indicator of the precoding matrix indicator report.

Aspect 7: The method of aspect 6, wherein a quantity of the one or more spatial layers is based at least in part on a value of the rank indicator.

Aspect 8: The method of any of aspects 1 through 7, wherein the first channel state information report includes either channel state information for just the dominant spatial layer or a full layer report for each spatial layer based at least in part on the channel state information configuration.

Aspect 9: The method of any of aspects 1 through 8, wherein the first channel state information report includes channel quality information for the non-dominant spatial layer and the dominant spatial layer.

Aspect 10: The method of any of aspects 1 through 9, further comprising: determining an updated precoder for the dominant spatial layer; and transmitting uplink control information to the base station indicating the updated precoder for the dominant spatial layer, wherein an indicator in the uplink control information indicates that the updated precoder is included in the uplink control information.

Aspect 11: The method of any of aspects 1 through 10, wherein the first feedback reporting periodicity for the non-dominant spatial layer is smaller than the second feedback reporting periodicity for the dominant spatial layer.

Aspect 12: A method for wireless communications at a base station, comprising: transmitting, to a UE, a channel state information configuration indicating a first feedback reporting periodicity for a dominant spatial layer and a second feedback reporting periodicity for a non-dominant spatial layer, wherein the first feedback reporting periodicity is different than the second feedback reporting periodicity; receiving a first channel state information report for at least the dominant spatial layer according to the first feedback reporting periodicity; and receiving a second channel state information report for at least the non-dominant spatial layer according to the second feedback reporting periodicity.

Aspect 13: The method of aspect 12, further comprising: transmitting downlink control information based at least in part on receiving the first channel state information report, the downlink control information including acknowledgment feedback for the first channel state information report.

Aspect 14: The method of any of aspects 12 through 13, further comprising: transmitting the channel state information configuration indicating a first codebook for the dominant spatial layer and a second codebook for the non-dominant spatial layer.

Aspect 15: The method of aspect 14, wherein the first codebook is different than the second codebook.

Aspect 16: The method of any of aspects 12 through 15, further comprising: receiving, from the UE, a precoding matrix indicator report including a layer indicator corresponding to the dominant spatial layer.

Aspect 17: The method of any of aspects 12 through 15, further comprising: receiving, from the UE, a precoding matrix indicator report indicating that one or more spatial layers are dominant spatial layers, wherein the one or more spatial layers are indicated based at least in part on a rank indicator of the precoding matrix indicator report.

Aspect 18: The method of aspect 17, wherein a quantity of the one or more spatial layers is based at least in part on a value of the rank indicator.

Aspect 19: The method of any of aspects 12 through 18, wherein the first channel state information report includes channel quality information for the non-dominant spatial layer and the dominant spatial layer.

Aspect 20: The method of any of aspects 12 through 19, further comprising: receiving uplink control information from the UE, wherein the uplink control information indicates an updated precoder for the dominant spatial layer, wherein an indicator in the uplink control information indicates that the updated precoder is included in the uplink control information.

Aspect 21: A method for wireless communications at a UE, comprising: receiving, from a base station, a channel state information configuration indicating a first codebook for a dominant spatial layer and a second codebook for a non-dominant spatial layer, wherein the first codebook is different than the second codebook; transmitting a first channel state information report for the non-dominant spatial layer based at least in part on the second codebook; receiving a first downlink control information configuring the UE to report channel state information for the dominant spatial layer and the non-dominant spatial layer; and transmitting a second channel state information report for the non-dominant spatial layer and the dominant spatial layer based at least in part on the first codebook and the second codebook.

Aspect 22: The method of aspect 21, further comprising: receiving, from the base station, a second downlink control information configuring the UE to disable reporting channel state information for the dominant spatial layer.

Aspect 23: The method of any of aspects 21 through 22, further comprising: receiving downlink control information based at least in part on transmitting the second channel state information report, the downlink control information including acknowledgment feedback for the first channel state information report and the second channel state information report.

Aspect 24: The method of any of aspects 21 through 23, further comprising: transmitting, to the base station, a precoding matrix indicator report including a layer indicator corresponding to the dominant spatial layer.

Aspect 25: The method of any of aspects 21 through 23, further comprising: transmitting, to the base station, a precoding matrix indicator report indicating that one or more layers are dominant spatial layers, wherein the one or more layers are indicated based at least in part on a rank indicator of the precoding matrix indicator report.

Aspect 26: The method of any of aspects 21 through 25, wherein the first channel state information report includes channel quality information for the non-dominant spatial layer and the dominant spatial layer.

Aspect 27: The method of any of aspects 21 through 26, further comprising: determining an updated precoder for the dominant spatial layer; and transmitting uplink control information to the base station to indicate the updated precoder for the dominant spatial layer, wherein an indicator in the uplink control information indicates that the updated precoder is included in the uplink control information.

Aspect 28: A method for wireless communications at a base station, comprising: transmitting, to a UE, a channel state information configuration indicating a first codebook for a dominant spatial layer and a second codebook for a non-dominant spatial layer, wherein the first codebook is different than the second codebook; receiving a first channel state information report for the non-dominant spatial layer based at least in part on the second codebook; transmitting a first downlink control information configuring the UE to report channel state information for the dominant spatial layer and the non-dominant spatial layer; and receiving a second channel state information report for the non-dominant spatial layer and the dominant spatial layer based at least in part on the first codebook and the second codebook.

Aspect 29: The method of aspect 28, further comprising: transmitting, to the UE, a second downlink control information configuring the UE to disable reporting channel state information for the dominant spatial layer.

Aspect 30: The method of any of aspects 28 through 29, further comprising: transmitting downlink control information based at least in part on receiving the second channel state information report, the downlink control information including acknowledgment feedback for the first channel state information report and the second channel state information report.

Aspect 31: An apparatus for wireless communications at a UE, comprising a processor; memory coupled with the processor; and instructions stored in the memory and executable by the processor to cause the apparatus to perform a method of any of aspects 1 through 11.

Aspect 32: An apparatus for wireless communications at a UE, comprising at least one means for performing a method of any of aspects 1 through 11.

Aspect 33: A non-transitory computer-readable medium storing code for wireless communications at a UE, the code comprising instructions executable by a processor to perform a method of any of aspects 1 through 11.

Aspect 34: An apparatus for wireless communications at a base station, comprising a processor; memory coupled with the processor; and instructions stored in the memory and executable by the processor to cause the apparatus to perform a method of any of aspects 12 through 20.

Aspect 35: An apparatus for wireless communications at a base station, comprising at least one means for performing a method of any of aspects 12 through 20.

Aspect 36: A non-transitory computer-readable medium storing code for wireless communications at a base station, the code comprising instructions executable by a processor to perform a method of any of aspects 12 through 20.

Aspect 37: An apparatus for wireless communications at a UE, comprising a processor; memory coupled with the processor; and instructions stored in the memory and executable by the processor to cause the apparatus to perform a method of any of aspects 21 through 27.

Aspect 38: An apparatus for wireless communications at a UE, comprising at least one means for performing a method of any of aspects 21 through 27.

Aspect 39: A non-transitory computer-readable medium storing code for wireless communications at a UE, the code comprising instructions executable by a processor to perform a method of any of aspects 21 through 27.

Aspect 40: An apparatus for wireless communications at a base station, comprising a processor; memory coupled with the processor; and instructions stored in the memory and executable by the processor to cause the apparatus to perform a method of any of aspects 28 through 30.

Aspect 41: An apparatus for wireless communications at a base station, comprising at least one means for performing a method of any of aspects 28 through 30.

Aspect 42: A non-transitory computer-readable medium storing code for wireless communications at a base station, the code comprising instructions executable by a processor to perform a method of any of aspects 28 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, a channel state information configuration indicating a first feedback reporting periodicity for a dominant spatial layer and a second feedback reporting periodicity for a non-dominant spatial layer, wherein the first feedback reporting periodicity is different than the second feedback reporting periodicity;
   transmitting a first channel state information report for at least the dominant spatial layer according to the first feedback reporting periodicity; and
   transmitting a second channel state information report for the non-dominant spatial layer according to the second feedback reporting periodicity.

2. The method of claim 1, further comprising:
   receiving downlink control information based at least in part on transmitting the first channel state information report, the downlink control information including acknowledgment feedback for the first channel state information report.

3. The method of claim 1, wherein receiving the channel state information configuration comprises:

receiving the channel state information configuration indicating a first codebook for the dominant spatial layer and a second codebook for the non-dominant spatial layer.

4. The method of claim 3, wherein the first codebook is different than the second codebook.

5. The method of claim 1, further comprising:
transmitting, to the base station, a precoding matrix indicator report including a layer indicator corresponding to the dominant spatial layer.

6. The method of claim 1, further comprising:
transmitting, to the base station, a precoding matrix indicator report indicating that one or more spatial layers are dominant spatial layers, wherein the one or more spatial layers are indicated based at least in part on a rank indicator of the precoding matrix indicator report.

7. The method of claim 6, wherein a quantity of the one or more spatial layers is based at least in part on a value of the rank indicator.

8. The method of claim 1, wherein the first channel state information report includes either channel state information for just the dominant spatial layer or a full layer report for each spatial layer based at least in part on the channel state information configuration.

9. The method of claim 1, wherein the second channel state information report includes channel quality information for the non-dominant spatial layer and the dominant spatial layer.

10. The method of claim 1, further comprising:
determining an updated precoder for the dominant spatial layer; and
transmitting uplink control information to the base station indicating the updated precoder for the dominant spatial layer, wherein an indicator in the uplink control information indicates that the updated precoder is included in the uplink control information.

11. The method of claim 1, wherein the first feedback reporting periodicity for the non-dominant spatial layer is smaller than the second feedback reporting periodicity for the dominant spatial layer.

12. A method for wireless communications at a base station, comprising:
transmitting, to a user equipment (UE), a channel state information configuration indicating a first feedback reporting periodicity for a dominant spatial layer and a second feedback reporting periodicity for a non-dominant spatial layer, wherein the first feedback reporting periodicity is different than the second feedback reporting periodicity;
receiving a first channel state information report for at least the dominant spatial layer according to the first feedback reporting periodicity; and
receiving a second channel state information report for at least the non-dominant spatial layer according to the second feedback reporting periodicity.

13. The method of claim 12, further comprising:
transmitting downlink control information based at least in part on receiving the first channel state information report, the downlink control information including acknowledgment feedback for the first channel state information report.

14. The method of claim 12, further comprising:
transmitting the channel state information configuration indicating a first codebook for the dominant spatial layer and a second codebook for the non-dominant spatial layer.

15. The method of claim 14, wherein the first codebook is different than the second codebook.

16. The method of claim 12, further comprising:
receiving, from the UE, a precoding matrix indicator report including a layer indicator corresponding to the dominant spatial layer.

17. The method of claim 12, further comprising:
receiving, from the UE, a precoding matrix indicator report indicating that one or more spatial layers are dominant spatial layers, wherein the one or more spatial layers are indicated based at least in part on a rank indicator of the precoding matrix indicator report.

18. The method of claim 17, wherein a quantity of the one or more spatial layers is based at least in part on a value of the rank indicator.

19. The method of claim 12, wherein the second channel state information report includes channel quality information for the non-dominant spatial layer and the dominant spatial layer.

20. The method of claim 12, further comprising:
receiving uplink control information from the UE, wherein the uplink control information indicates an updated precoder for the dominant spatial layer, wherein an indicator in the uplink control information indicates that the updated precoder is included in the uplink control information.

21. A method for wireless communications at a user equipment (UE), comprising:
receiving, from a base station, a channel state information configuration indicating a first codebook for a dominant spatial layer and a second codebook for a non-dominant spatial layer, wherein the first codebook is different than the second codebook;
transmitting a first channel state information report for the non-dominant spatial layer based at least in part on the second codebook;
receiving a first downlink control information configuring the UE to report channel state information for the dominant spatial layer and the non-dominant spatial layer; and
transmitting a second channel state information report for the non-dominant spatial layer and the dominant spatial layer based at least in part on the first codebook and the second codebook.

22. The method of claim 21, further comprising:
receiving, from the base station, a second downlink control information configuring the UE to disable reporting channel state information for the dominant spatial layer.

23. The method of claim 21, further comprising:
receiving downlink control information based at least in part on transmitting the second channel state information report, the downlink control information including acknowledgment feedback for the first channel state information report and the second channel state information report.

24. The method of claim 21, further comprising:
transmitting, to the base station, a precoding matrix indicator report including a layer indicator corresponding to the dominant spatial layer.

25. The method of claim 21, further comprising:
transmitting, to the base station, a precoding matrix indicator report indicating that one or more layers are dominant spatial layers, wherein the one or more layers are indicated based at least in part on a rank indicator of the precoding matrix indicator report.

26. The method of claim 21, wherein the first channel state information report includes channel quality information for the non-dominant spatial layer and the dominant spatial layer.

27. The method of claim 21, further comprising:

determining an updated precoder for the dominant spatial layer; and transmitting uplink control information to the base station to indicate the updated precoder for the dominant spatial layer, wherein an indicator in the uplink control information indicates that the updated precoder is included in the uplink control information.

28. A method for wireless communications at a base station, comprising:

transmitting, to a user equipment (UE), a channel state information configuration indicating a first codebook for a dominant spatial layer and a second codebook for a non-dominant spatial layer, wherein the first codebook is different than the second codebook;

receiving a first channel state information report for the non-dominant spatial layer based at least in part on the second codebook;

transmitting a first downlink control information configuring the UE to report channel state information for the dominant spatial layer and the non-dominant spatial layer; and receiving a second channel state information report for the non-dominant spatial layer and the dominant spatial layer based at least in part on the first codebook and the second codebook.

29. The method of claim 28, further comprising:

transmitting, to the UE, a second downlink control information configuring the UE to disable reporting channel state information for the dominant spatial layer.

30. The method of claim 28, further comprising:

transmitting downlink control information based at least in part on receiving the second channel state information report, the downlink control information including acknowledgment feedback for the first channel state information report and the second channel state information report.

\* \* \* \* \*